US012726376B2

(12) United States Patent
Kwon et al.

(10) Patent No.: US 12,726,376 B2
(45) Date of Patent: Sep. 1, 2026

(54) MULTICAST SIGNAL PROCESSING METHOD AND DEVICE

(71) Applicant: LG ELECTRONICS INC., Seoul (KR)

(72) Inventors: Woosuk Kwon, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 18/557,001

(22) PCT Filed: Apr. 18, 2022

(86) PCT No.: PCT/KR2022/005536
§ 371 (c)(1),
(2) Date: Oct. 24, 2023

(87) PCT Pub. No.: WO2022/239983
PCT Pub. Date: Nov. 17, 2022

(65) Prior Publication Data

US 2024/0214234 A1 Jun. 27, 2024

Related U.S. Application Data

(60) Provisional application No. 63/187,867, filed on May 12, 2021.

(30) Foreign Application Priority Data

Jul. 29, 2021 (KR) ........................ 10-2021-0100078

(51) Int. Cl.
*H04L 12/18* (2006.01)
*H04L 69/04* (2022.01)
*H04L 69/14* (2022.01)

(52) U.S. Cl.
CPC ............ *H04L 12/184* (2013.01); *H04L 69/04* (2013.01); *H04L 69/14* (2013.01)

(58) Field of Classification Search
CPC ........ H04L 12/184; H04L 69/04; H04L 69/14
See application file for complete search history.

(56) References Cited

U.S. PATENT DOCUMENTS 10,659,281 B2 * 5/2020 Kwon ................. H04L 41/0226
11,277,501 B2 * 3/2022 Kwon .............. H04N 21/64322
(Continued)

FOREIGN PATENT DOCUMENTS

EP 2842335 B1 * 7/2019 ....... H04N 21/64322
KR 10-1563001 10/2015
(Continued)

OTHER PUBLICATIONS

PCT International Application No. PCT/KR2022/005536, International Search Report dated Aug. 11, 2022, 17 pages.
(Continued)

*Primary Examiner* — Angela Widhalm De Rodriguez
(74) *Attorney, Agent, or Firm* — LEE, HONG, DEGERMAN, KANG & WAIMEY

(57) ABSTRACT

A multicast signal transmission method, according to the embodiments, may comprise the steps of: receiving Internet Protocol (IP) streams from an upper layer; compressing, at a link layer, IP headers of the IP streams; generating link control information for link layer-related multicast; encapsulating IP header-compressed Robust Header Compression (ROHC) streams; encapsulating the link control information and an IP header compression-related descriptor; and transmitting, in a physical layer, a stream including the link control information, the descriptor and the ROHC streams. A multicast signal reception method, according to the embodiments, comprises the steps of: receiving a multicast
(Continued)

signal from a physical layer; decompressing, at a link layer, IP headers of IP streams of the multicast signal; and parsing link control information for multicast, and an IP header compression-related descriptor, wherein IP header-compressed ROHC streams may be decapsulated.

9 Claims, 26 Drawing Sheets

(56) References Cited

U.S. PATENT DOCUMENTS

| | | | | |
|---|---|---|---|---|
| 2018/0041782 | A1* | 2/2018 | Kwon | H04L 12/18 |
| 2018/0198671 | A1* | 7/2018 | Kwon | H04N 21/64322 |
| 2020/0186624 | A1* | 6/2020 | Kwon | H04N 21/242 |
| 2020/0336572 | A1* | 10/2020 | Kwon | H04N 21/8358 |

FOREIGN PATENT DOCUMENTS

| | | |
|---|---|---|
| KR | 10-2001014 | 7/2019 |
| KR | 10-2020-0015732 | 2/2020 |
| KR | 10-2020-0050906 | 5/2020 |
| KR | 10-2021-0037013 | 4/2021 |
| WO | 2020-091573 | 5/2020 |

OTHER PUBLICATIONS

European Patent Office Application Serial No. 22171869.5, Search Report dated Oct. 17, 2022, 8 pages.

* cited by examiner

FIG. 3

ROHC-U descriptor

| Syntax | | No. of Bits | No. of Bits |
|---|---|---|---|
| ROHC-U_descriptor () { | | | |
| descriptor_tag | | 8 | uimsbf |
| descriptor_length | | 8 | uimsbf |
| context_id | | 8 or 16 | bslbf |
| context_profile | | 8 | uimsbf |
| static_chain_length | | 8 | uimsbf |
| for (i=0 ; i<N ; i++) { | Including | | |
| static_chain_byte | - Source/Destination IP address | 8 | bslbf |
| } | - Source/Destination Port | | |
| } | | | |

| Syntax | No. of Bits | Mnemonic |
|---|---|---|
| LCD () { | | |
| PHY_descriptors () | variable | bslbf |
| number_of_links | 16 | uimsbf |
| for (i=0 ; i<N; i++) { | | |
| link_id | 16 | uimsbf |
| link_association_descriptors () | variable | bslbf |
| } | | |
| } | | |

| Syntax | No. of Bits | Mnemonic |
|---|---|---|
| Link_association_descriptor () { | | |
| descriptor_tag | 8 | uimsbf |
| descriptor_length | 8 | uimsbf |
| modulation_system_type | 8 | uimsbf |
| modulation_system_id | 16 | uimsbf |
| PHY_stream_id | 16 | uimsbf |
| } | | |

| modulation_system_type | | PHY_stream_id encoding |
|---|---|---|
| 0x00 | DVB-S2 [22] | The Input Stream Idntifier (ISI) shall be encoded as a 16-bit uimsbf. |
| 0x01 | DVB-T2 [23] | The Physical Layer Pipe (PLP) identifier shall be encoded as a 16-bit uimsbf |
| 0x02 | DVB-C2 [24] | The data Slice idntifier shall be encoded in the bits $b_{15}$ through $b_8$ as a 8-bit uimsbf, and the Physical Layer Pipe (PLP) identifier shall be encoded in the bits $b_7$ through $b_0$ as an 8-bit uimsbf. |
| 0x03 | DVB-NGH [25] | The Physical Layer Pipe (PLP) identifier shall be encoded as a 16-bit uimsbf. |

FIG. 9

| Syntax | No. of Bits | Mnemonic | Applicable as of protocol version |
|---|---|---|---|
| IP_multicast_list_descriptor() { | | | |
| descriptor_tag | 8 | uimsbf | 2 |
| descriptor_length | 8 | uimsbf | 2 |
| num_multicasts | 8 | uimsbf | 2 |
| for (i=0; i<num_multicasts-1; i++){ | | | |
| multicast_stream_id | 8 | uimsbf | 2 |
| source_ipv4_address | 32 | uimsbf | 2 |
| destination_ipv4_address | 32 | uimsbf | 2 |
| source_port | 16 | uimsbf | 2 |
| destination_port | 16 | uimsbf | 2 |
| header_compression_flag | 1 | bslbf | 2 |
| reserved_for_future_use | 7 | bslbf | 2 |
| } | | | |
| } | | | |

FIG. 10

| Syntax | No. of Bits | Mnemonic | Applicable as of protocol version |
|---|---|---|---|
| IPv6_multicast_list_descriptor() { | | | |
| descriptor_tag | 8 | uimsbf | 2 |
| descriptor_length | 8 | uimsbf | 2 |
| num_multicasts | 8 | uimsbf | 2 |
| for (i=0; i<num_multicasts-1; i++){ | | | |
| multicast_stream_id | 8 | uimsbf | 2 |
| source_ipv6_address | 128 | uimsbf | 2 |
| destination_ipv6_address | 128 | uimsbf | 2 |
| source_port | 16 | uimsbf | 2 |
| destination_port | 16 | uimsbf | 2 |
| header_compression_flag | 1 | bslbf | 2 |
| reserved | 7 | bslbf | 2 |
| } | | | |
| } | | | |

FIG. 11

| Syntax | No. of Bits | Mnemonic | Applicable as of protocol version |
|---|---|---|---|
| ROHC-U_multicast_descriptor() { | | | |
| descriptor_tag | 8 | uimsbf | 2 |
| descriptor_length | 8 | uimsbf | 2 |
| rohc_ch_id | 16 | uimsbf | 2 |
| max_CID | 7 | uimsbf | 2 |
| adaptation_flag | 1 | bslbf | 2 |
| num_rohc_flow | 8 | uimsbf | 2 |
| for (i=0; i<num_rohc_flow; i++){ | | | |
| context_id | 8 | bslbf | 2 |
| context_profile | 8 | uimsbf | 2 |
| multicast_stream_id | 8 | uimsbf | 2 |
| if (adaptation_flag==1){ | | | |
| static_chain_length | 8 | uimsbf | 2 |
| for (i=0;i<N;i++) { | | | |
| static_chain_byte | 8 | bslbf | 2 |
| } | | | |
| } | | | |
| } | | | |
| } | | | |

FIG. 12

| Syntax | No. of Bits | Mnemonic | Applicable as of protocol version |
|---|---|---|---|
| ROHC-U_descriptor() { | | | |
| descriptor_tag | 8 | uimsbf | 0 |
| descriptor_length | 8 | uimsbf | 0 |
| rohc_ch_id | 16 | uimsbf | 2 |
| context_id | 8 | bslbf | 0 |
| context_profile | 8 | uimsbf | 0 |
| static_chain_length | 8 | uimsbf | 0 |
| for (i=0;i<N;i++) { | | | |
| static_chain_byte | 8 | bslbf | 0 |
| } | | | |
| } | | | |

FIG. 18

| Profile identifier | Used for | Reference |
|---|---|---|
| 0x0001 | RTP/UDP/IP | RFC 3095 [4] and RFC 4815 [5] |
| 0x0002 | UDP/IP | RFC 3095 [4] and RFC 4815 [5] |
| 0x0003 | ESP/IP | RFC 3095 [4] and RFC 4815 [5] |
| 0x0004 | IP | RFC 3843 [6] and RFC 4815 [5] |

FIG. 20

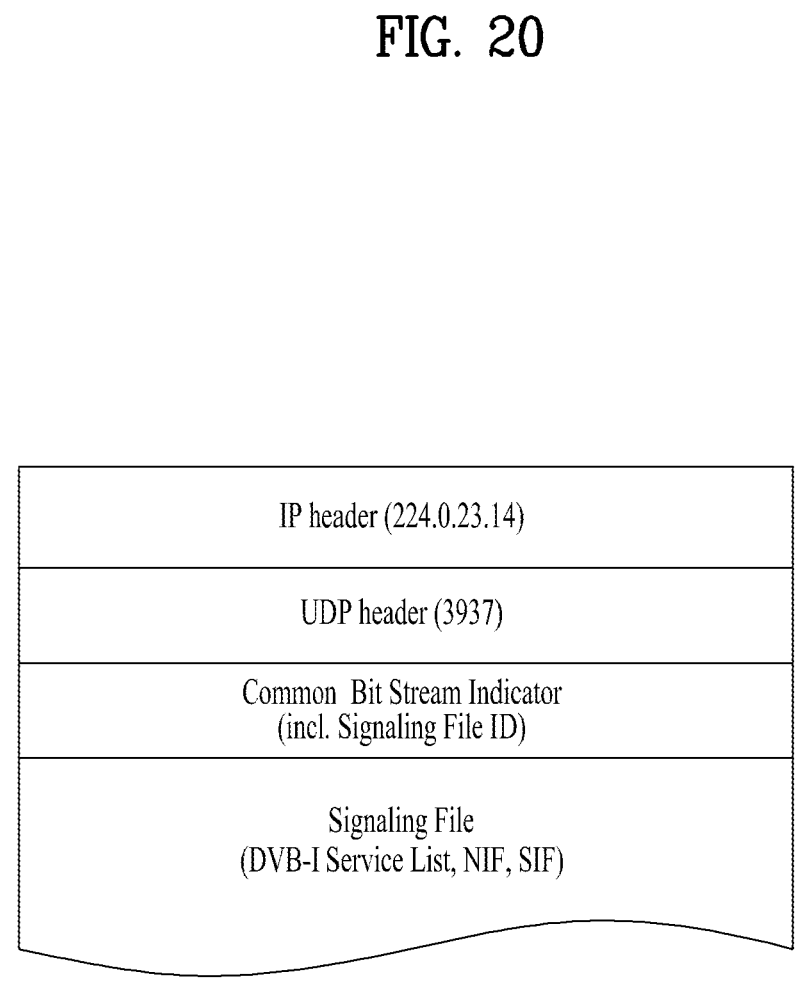

| IP header (224.0.23.14) |
|---|
| UDP header (3937) |
| Common Bit Stream Indicator (incl. Signaling File ID) |
| Signaling File (DVB-I Service List, NIF, SIF) |

MULTICAST SIGNAL PROCESSING METHOD AND DEVICE

CROSS-REFERENCE TO RELATED APPLICATIONS

This application is the National Stage filing under 35 U.S.C. 371 of International Application No. PCT/KR2022/005536, filed on Apr. 18, 2022, which claims the benefit of earlier filing date and right of priority to Korean Application No. 10-2021-0100078, filed on Jul. 29, 2021, and also claims the benefit of U.S. Provisional Application No. 63/187,867, filed on May 12, 2021, the contents of which are all hereby incorporated by reference herein in their entireties.

TECHNICAL FIELD

The present disclosure relates to an apparatus and method for processing a multicast signal.

BACKGROUND ART

With the development of digital technology and communication technology, distribution and demand of audio/video-oriented multimedia contents are rapidly expanding in various areas such as broadcasting, movies, Internet and personal media. In addition, as the size of TV screens adopted by households increases with the development of display technology, ultra high definition (UHD) broadcast services are increasingly discussed.

Regarding a broadcast service, a multicast transmission scheme for transmitting the same content to a plurality of users is effective because it can take advantage of both unicast and broadcast. The conventional multicast transmission scheme is available only within a single network, and cannot support a multicast service between heterogeneous networks. As a result, when a multicast reception device establishes and releases connection to different access networks, a new multicast service is allowed to be started after the existing multicast service is terminated. In addition, when multiple delivery protocols are used, a protocol constituting payload on IP/UDP or IP/TCP cannot be identified with a port number unless registered in the IANA. In the case of IP multicast, values assigned to multicast are used as the destination address and port number, and thus all receivers receive the corresponding packet. If an unknown protocol is used at this time, multicast of the packet may not be processed.

DISCLOSURE

Technical Problem

An object of the present disclosure is to provide a multicast signal transmission method and apparatus which are capable of improving transmission efficiency.

An object of the present disclosure is to efficiently provide a multicast service between multiple networks.

The technical scope of the embodiments is not limited to the aforementioned technical objects, and may be extended to other technical objects that may be inferred by those skilled in the art based on the entire contents disclosed herein.

Technical Solution

According to embodiments, a method for transmitting a multicast signal may include receiving Internet Protocol (IP) streams from an upper layer; compressing IP headers of the IP streams in a link layer; generating link control information for multicast related to the link layer; encapsulating Robust Header Compression (ROHC) streams with the compressed IP headers; encapsulating a descriptor related to IP header compression and the link control information; and transmitting a stream including the link control information, the descriptor, and the ROHC streams in a physical layer. According to embodiments, a method for receiving a multicast signal may include receiving a multicast signal from a physical layer; decompressing Internet Protocol (IP) headers of IP streams of the multicast signal in a link layer; parsing link control information for multicast and a descriptor related to IP header compression; and decapsulating IP header-compressed Robust Header Compression (ROHC) streams.

Advantageous Effects

According to an embodiment of the present disclosure, a multicast service may be provided between multiple networks.

According to the embodiments, a media architecture for multicast media streaming based on multiple networks may be provided, thereby enabling the same level of media service over multiple networks to which the DVB multicast ABR structure may be applied.

According to embodiments, multicast content may be received through various access methods without depending on a network to which a reception device is connected during multicast streaming.

According to embodiments, even when various devices are connected to separate networks, the same level of ABR multicast service may be provided.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 3 shows syntax of a ROHC-U descriptor according to embodiments;

FIG. 6 shows a ROHC-U descriptor according to embodiments;

FIG. 7 shows link control data (LCD) and a link association descriptor according to embodiments;

FIG. 9 shows an IP multicast list descriptor according to embodiments;

FIG. 10 shows an IPv6 multicast list descriptor according to embodiments;

FIG. 11 shows a ROHC-U multicast descriptor according to embodiments;

FIG. 12 shows a ROHC-U descriptor according to embodiments;

FIG. 18 shows a ROHC profile for DVB-GSE according to embodiments, wherein the ROHC profile may include RTP/UDP/IP, UDP/IP, ESP/IP, and IP;

FIG. 20 shows an IP/UDP packet according to embodiments;

FIG. 20 shows an IP/UDP packet according to embodiments;

BEST MODE

Figure 1A:
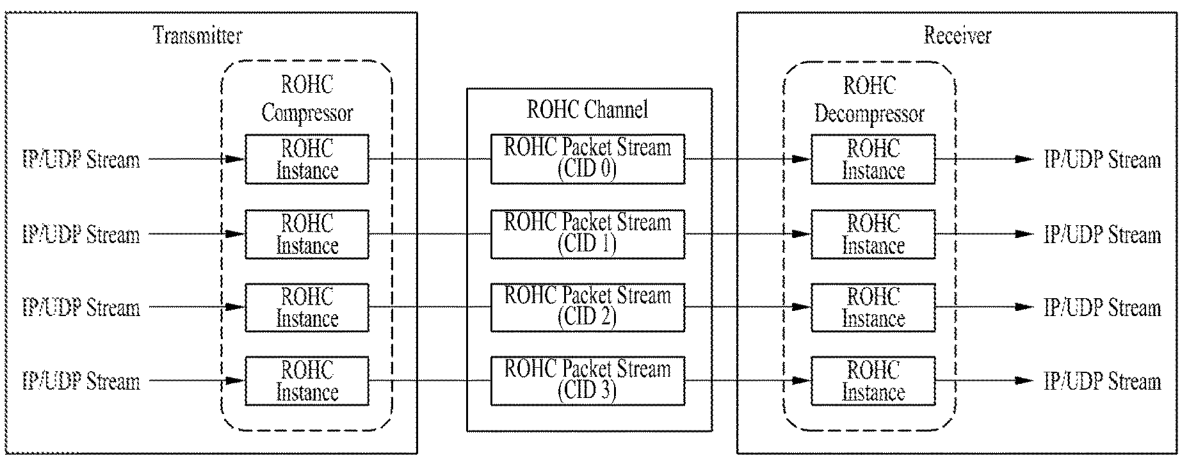
FIGS. 1A, 1B, 1C, and 1D show examples of ROHC frameworks according to embodiments.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

A method/apparatus for processing a multicast signal according to the embodiments may represent a method/apparatus for transmitting a multicast signal and a method/apparatus for receiving a multicast signal. It may be referred to simply as a method/apparatus according to embodiments. The multicast signal may be referred to as multicast data, multicast media data, multicast service data, media data, service data, or the like.

The method/apparatus according to the embodiments may provide a multicast service based on considerations of GSE and ROHC for a native IP system.

In the embodiments, GSE is an abbreviation for general stream encapsulation. ROHC is an abbreviation for robust header compression.

The ROHC framework according to the embodiments is described below.

ROHC-related standards according to embodiments may include RFC 3095 (initial ROHC document), RFC 4815 (revision and explanation of RFC 3095), and RFC 5795 (improvement of the ROHC framework).

A ROHC channel according to embodiments is described below.

ROHC header-compressed packets are sent over channels. A cellular radio link may be considered, and a link may have channels connecting the same pair of nodes. Each channel may have different characteristics in terms of error rate, bandwidth, and the like. The CID space may be distinguished for each channel. For example, CID 3 on channel A and CID 3 on channel B do not refer to the same context. Channel configuration parameters are provided per channel parameter.

A context and a context ID (CID) according to embodiments are described below.

The context may include relevant information from previous headers in the packet flow. There may be static fields and possible reference values for compression and decompression.

Static fields in IPv4: version, protocol, source address, and destination address.

Static fields of UDP: source port and destination port

Multiple packet streams with different contexts may share one channel.

Each packet stream can be identified based on the context ID.

FIGS. 1A, 1B, 1C, and 1D show examples of ROHC frameworks according to embodiments.

The ROHC according to the embodiments may be configured as shown in FIGS. 1A, 1B, 1C, and 1D. Identifier and CID information for the ROHC channel according to each configuration may be provided.

As shown in FIG. 1A, a transmitter according to the embodiments may compress IP/UDP streams by a ROHC compressor. The ROHC-compressed IP/UDP streams may be delivered to the receiver according to the embodiments on a ROHC channel. ROHC packet streams on the ROHC channel may be identified by the CID. For example, a ROHC packet stream corresponding to CID 0, a ROHC packet stream corresponding to CID 1, a ROHC packet stream corresponding to CID 2, and a ROHC packet stream corresponding to CID 3 are transmitted/received on the channel. The receiver may decompress the ROHC packet streams by a ROHC decompressor. FIG. 1A may include ROHC instances in which one ROHC compressor compresses a plurality of IP/UDP streams. Similarly, FIG. 1A may include ROHC instances in which one ROHC decompressor decompresses a plurality of packet streams.

Figure 1B:
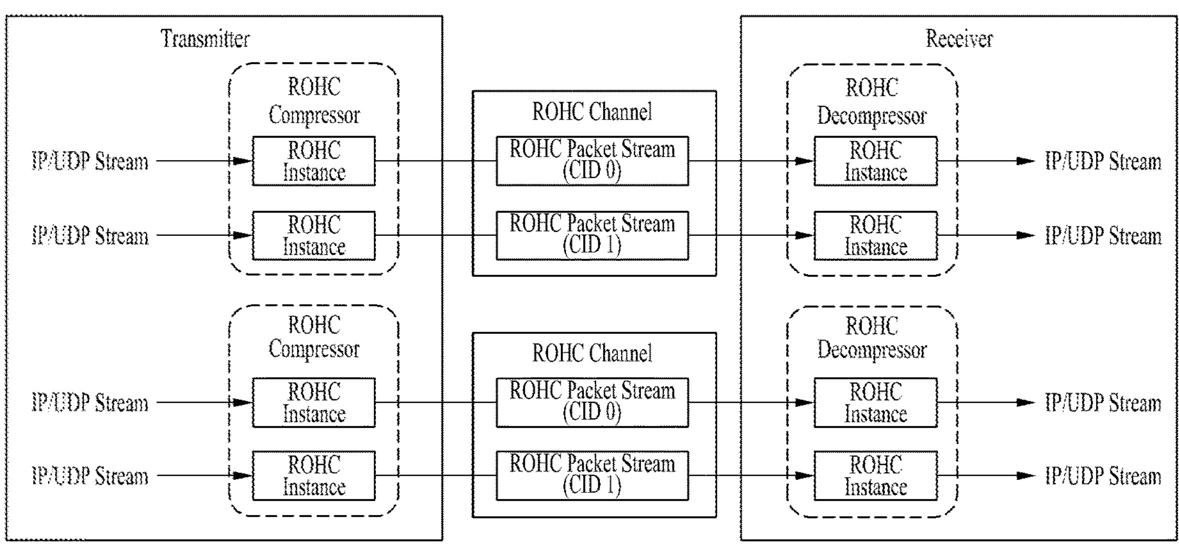

As shown in FIG. 1B, the transmitter/receiver may include two or more ROHC compressors/decompressors. In addition, there may be two ROHC channels corresponding to CID 0 and CID 1, respectively.

Figure 1C:
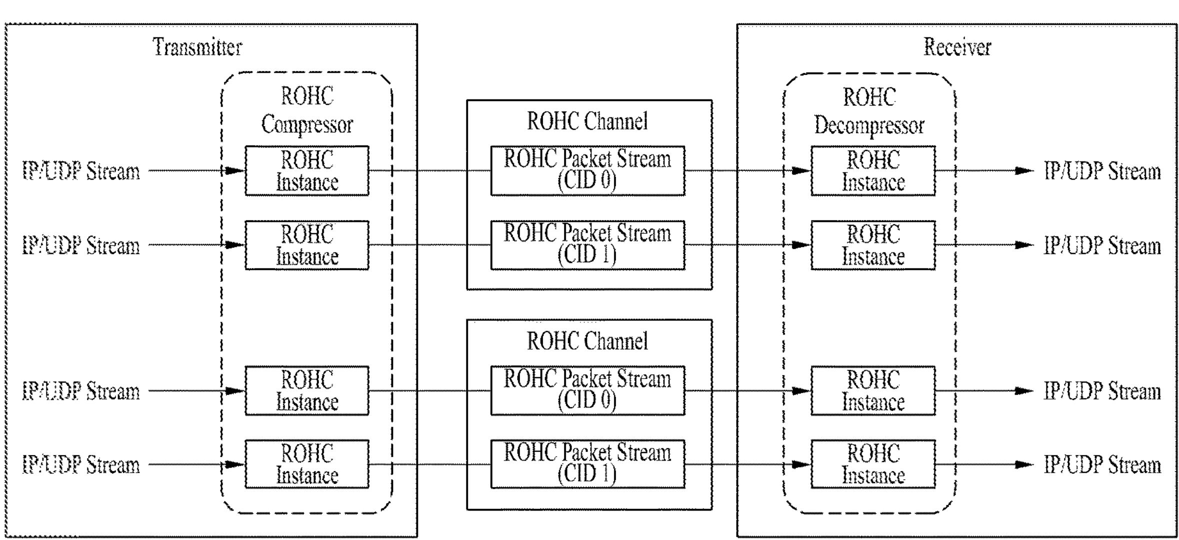

As shown in FIG. 1C, one compressor/one decompressor may be configured, and two channels may be used.

Figure 1D:
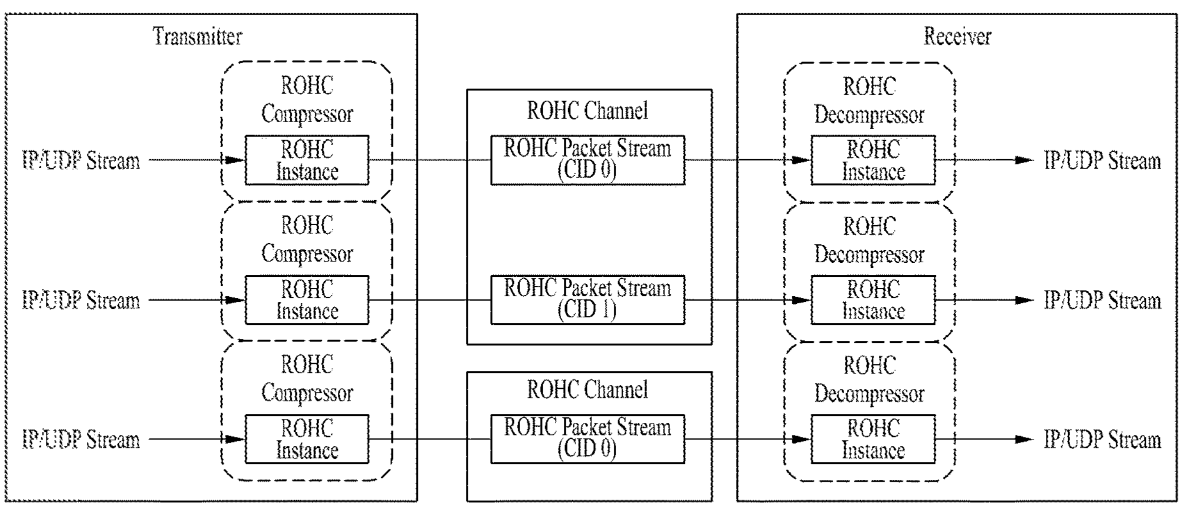

As shown in FIG. 1D, multiple compressors/multiple decompressors may be configured, and multiple ROHC channels may be used.

Each component of FIG. 1 may correspond to hardware, software, a processor, and/or a combination thereof.

Figure 2:
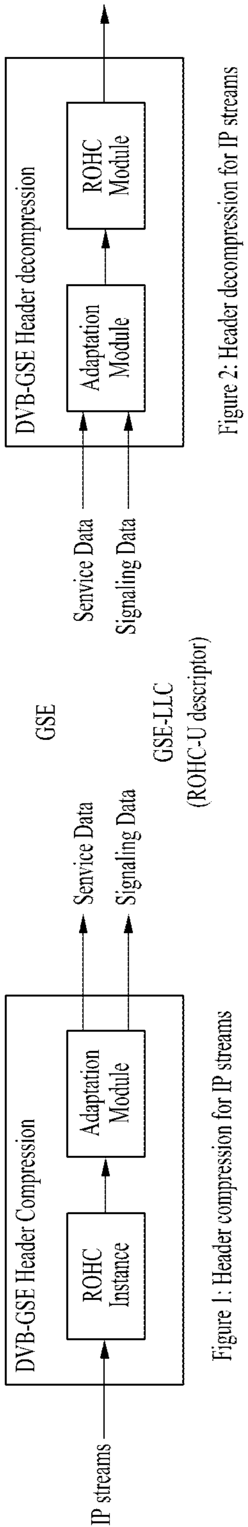
FIG. 2 illustrates a GSE header compressor according to embodiments.

FIG. 2 illustrates a GSE header compressor according to embodiments.

As shown in FIGS. 1 and 2, the method/apparatus according to the embodiments may perform GSE processing on the IP/UDP streams in a link layer, and may compress and reconstruct an IP packet header. The ROHC-U in the GSE according to the embodiment may generate and deliver a GSE-LLC (Logic Link Control). LLC refers to the generation of signaling information in the link layer. Configuration parameters and context information may be generated and transmitted. In an adaptation mode according to the embodiments, the GSE-LLC may be transmitted by out-of-band transmission.

FIG. 2 is a detailed structural diagram of the ROHC compressor and decompressor of FIG. 1.

Each component of FIG. 2 may correspond to hardware, software, a processor, and/or a combination thereof.

The GSE header compressor may be referred to as a link layer header compressor, a link layer IP header compressor, a header compressor, or the like.

The header compressor may receive an IP stream. The header compressor may include a ROHC module and an Adaptation module. Service data and signaling data may be generated as a result of header compression. The service data is data compressed in the link layer, and may be referred to as GSE data. The signaling data represents signaling information related to link layer compression, and may be referred to as GSE-LLC signaling data (or control information) or the like. For example, the signaling data may include a ROHC-U descriptor.

The header decompressor may receive compressed service data and signaling data, and may perform a decompression operation, which is a reverse process of the compression, by the adaptor module and the ROUC module.

According to this configuration, efficient transmission of packet streams may be supported by compressing the header of the IP stream.

The channel parameter represents signaling information or parameters related to the GSE operation.

The ROHC-U descriptor for GSE-LLC may be generated for context parameter signaling. The ROUC-U descriptor may be identified based on Link_ID in the GSE-LLC. Link_ID may be considered as a ROHC channel ID. There may be no explicit description information.

FIG. 3 shows syntax of a ROHC-U descriptor according to embodiments.

FIG. 3 shows the ROHC-U descriptor transmitted in FIGS. 1 and 2. The ROHC-U descriptor may include an ID (context_id) of a context related to header compression, a context profile (context_profile), a static chain length (static_chain_length) related to header compression, and a static chain byte (static_chain_byte). Furthermore, it may include a source IP address, destination IP address, source port information, and destination port information, which are related to the source and destination of the ROHC descriptor. The port may mean a UDP port.

When multiple ROHC channels and context IDs are used, ROHC-U descriptors as many as context IDs may be transmitted in the GSE-LLC. The number of ROHC-U descriptors may be equal to the result of multiplication between ROHC channels and CIDs. Information for the UDP port in the GSE-LLC may be further required. It may indicate a transmission source and a transmission destination of the ROHC-U descriptor.

DVB-GSE provides the following characteristics for the operation of the ROHC framework.

When any change in the static fields of an input IP stream is detected by the ROHC compressor, the ROHC compressor performs context re-initialization, and a CONTEXT_REINITIALIZATION signal is triggered. For example, it may be triggered as in the RFC 3095 document. A new value of the context ID (CID) may be assigned to the compressed IP stream. The new CID is unique to the system and is not used by instances of other ROHC compressors operating in the system.

Some ROHC compressors and decompressors used with DVB-GSE operate in an unidirectional mode. The unidirectional mode may conform to RFC 3095.

The ROHC implementation parameters of the compressor according to the embodiments are configured as follows (For example, they may conform to RFC 3095).

Regarding the CONTEXT_REINITIALIZATION signal according to the embodiments, this parameter triggers reinitialization of the entire context in the decompressor. When CONTEXT_REINITIALIZATION is triggered, the compressor stops the IR state and transmits IR packets having both static and dynamic chains covering the entire uncompressed headers to the extent that it is reasonably certain that the decompressor reinitializes the contexts, thereby completely reinitializing the context.

The considerations according to the embodiments are given as follows. Context reinitialization is intended when the physical link changes. However, it may not occur within the broadcast link.

When the physical link is not changed, "change in static fields of the input IP stream" means that a new IP stream is input.

However, other restrictions may be added to the GSE. In this case, all contexts of the compressor and the decompressor may be initialized according to the RFC document.

Initialization of context information of other IP streams in the GSE may not be intended.

When multiple IP streams are managed in the ROHC compressor, the change in the static context of the IP stream affects the contexts of other IP streams. Accordingly, it may work when a single IP stream is delivered in the compressor.

According to embodiments, ROHC-U may be in ALP. The ALP may mean the ATSC link layer protocol.

A compressor and/or a decompressor according to embodiments may support three adaptation modes. Mode 1 is the same as that in the RFC standard. Mode 2 is similar to GSE ROHC-U. Mode 3 means optimization of mode 2 for the broadcasting link. Signaling may be performed for each context ID. The signaling information may include a ROHC-U descriptor table, a catalog RDT, and a discrete RDT. The catalog RDT may be provided for bootstrapping, and the discrete RDT may be used to transmit updated information. ROHC channels may be mapped to a physical layer pipe (PLP) and transmitted. A single ROHC channel may be in the PLP.

Figure 4:
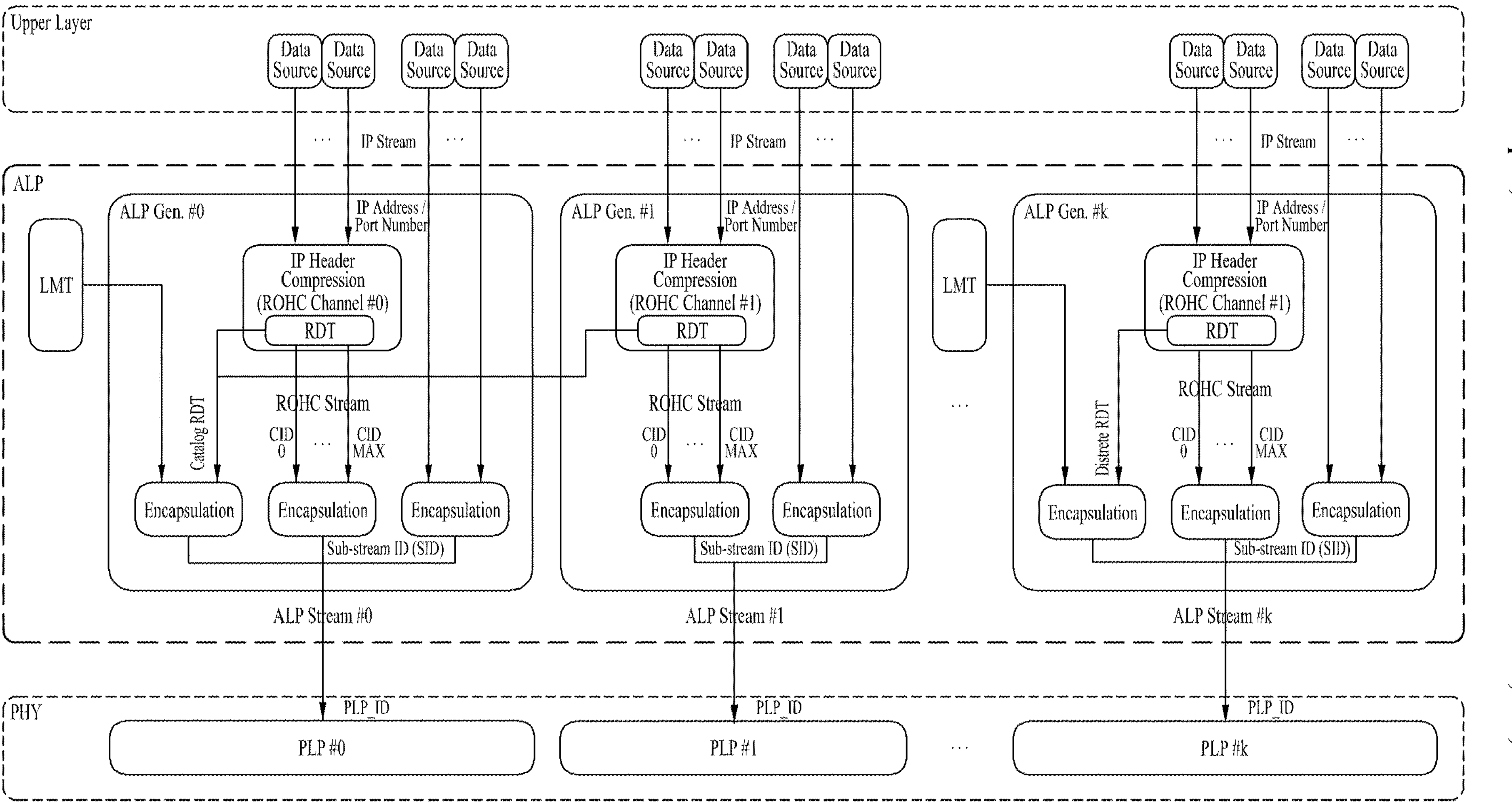
FIG. 4 shows a ROHC-U related system architecture according to embodiments.

FIG. 4 shows a ROHC-U related system architecture according to embodiments.

IP header compression-related ROHC-U according to the embodiments may be included in an ALP layer. Data sources from the upper layer may be transmitted to the ALP link layer, and the IP header may be compressed, an RDT, which is signaling information related to header compression, may be generated and encapsulated into an ALP packet. The ALP packet may be mapped to the PLP and transmitted. A link mapping table (LMT), which is link layer signaling information, may include information about mapping between the link layer and a physical layer. The IP header compressed ROHC stream may have a CID. An ALP encapsulated stream may have a sub-stream ID.

Figure 5:
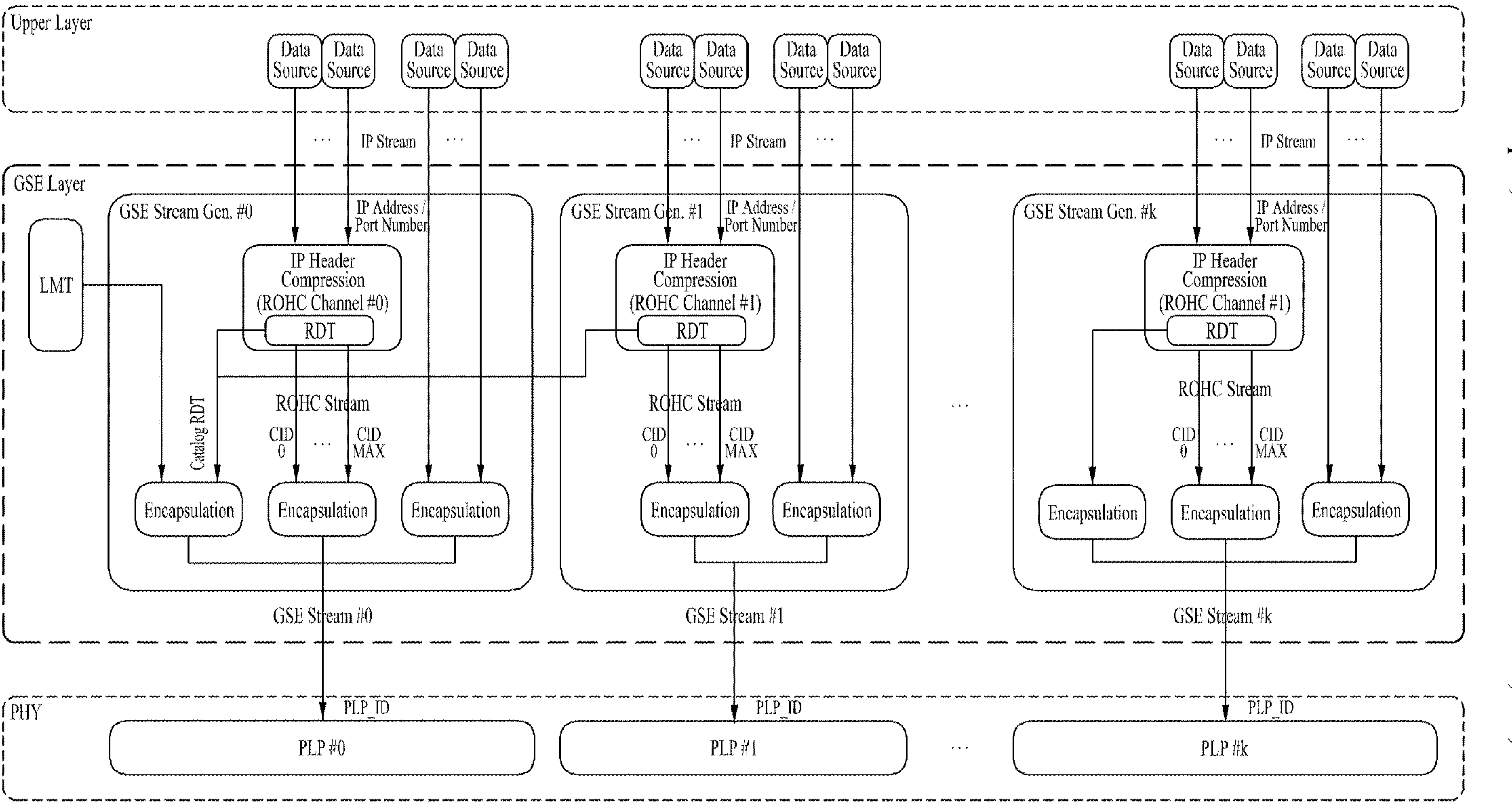
FIG. 5 shows a ROHC-U related system architecture according to embodiments.

FIG. 5 shows a ROHC-U related system architecture according to embodiments.

FIG. 5 shows architecture in which the GSE layer includes a ROHC compressor. Upon receiving the IP stream containing data elements from the upper layer, the GSE layer may compress the IP header through the ROHC compressor and generate signaling information such as GSE-LLC and ROHC-U descriptors. The GSE-LLC may be encapsulated, mapped to the PLP, and transmitted. The ROHC-U descriptor and GSE-LLC may be encapsulated together. The IP header compressed ROHC stream may be encapsulated based on the CID and a GSE stream may be output based thereon. The GSE stream may be mapped to the PLP and transmitted.

Figure 6:
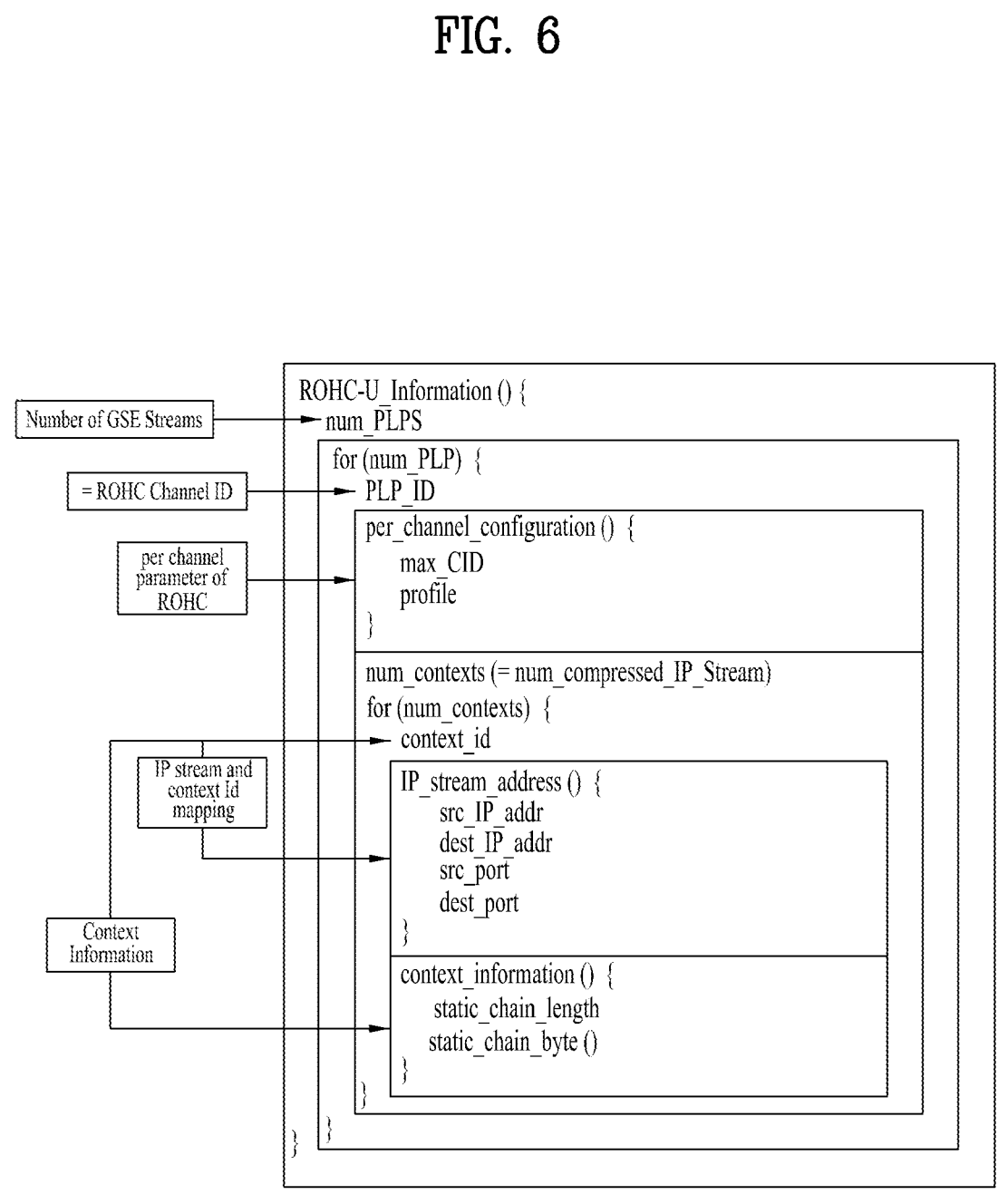

FIG. 6 shows a ROHC-U descriptor according to embodiments.

The ROHC-U descriptor information of GSE for multicast is configured as follows. It may include channel information. Each piece of channel information may include: mapping information between a CID and an IP flow address (IP address and UDP port), a ROHC channel ID, GSE stream mapping information, and a physical layer stream ID such as PLP_ID.

An example of ROHC signaling according to the embodiments is described below. When a single GSE stream is delivered by one PLP. PLP_ID may be regarded as a GSE stream ID. When a single logical ROHC channel is defined in one GSE stream, the GSE stream ID may be regarded as a ROHC channel ID.

The ROHC-U information may num_PLP. num_PLP may indicate the number of GSE streams.

Each num_PLP may have PLP_ID. PLP ID may indicate a ROHC channel ID.

The channel configuration information may have max_CID and a profile. It indicates channel configuration information of ROHC.

The ROHC-U information may include num_contexts. num_contexts may indicate the number of contexts and correspond to the number of compressed IP streams (num_compressed_IP_stream).

The ROHC-U information may include context_id for each context. Mapping information about an IP stream may be delivered based on the context_id. Context information may be delivered based on the context_id.

For example, the IP stream address information (IP_stream_address) may include a source IP address (src_IP_addr), a destination IP address (dest_IP_addr), a source port (src_port), and a destination port (dest_port), which indicate the addresses of the source and the destination of the multicast. The context information (context_information) may include static_chain_length and static_chain_byte, which are information compressed in relation to header compression.

FIG. 7 shows link control data (LCD) and a link association descriptor according to embodiments.

GSE-LLC, which is signaling information of the GSE layer according to embodiments, may include LCD and a link association descriptor.

A GSE-LLC data model may represent an IP stream flow and a link ID association description.

Link: A link represents a virtual network interface on the receiver. The link may be associated with one IP flow. Since the same data stream is available in one or more modulation system streams, a link may appear in one or more instances. Each link may be associated with one modulation system stream according to a modulation system type, a modulation system ID, and a physical stream ID (e.g., a specific PLP in the DVB-T2 system). Because the same data is carried in all instances of the link, receivers may switch between instances of a particular link, but different routes may exhibit different propagation delays applied to the data.

IP flow: This entity represents a data stream carried over a given link. Because the same data is available in various locations, an IP flow may be associated with one or more links. An IP flow may be described by targeting parameters (e.g., parameters that describe an IP source and/or destination addresses in the flow) and operational parameters (e.g., ROHC-U header compression parameters). A connection between an IP flow and links may be established by a link ID.

The LCD may include a physical descriptor and information on the number of links. According to the number of links, a link ID and a link association descriptor may be delivered.

The link association descriptor may include modulation_system_type, modulation_system_id, and PHY_stream_ID.

The PHY_stream_ID may specify encoding information according to the modulation system type.

For example, when modulation_system_type is equal to 0, the modulation system type is DVB-S2, and PHY_stream_id indicates that the input stream identifier (ISI) is encoded as a 16-bit uimsbf.

When modulation_system_type is equal to 1, the modulation system type is DVB-T2, and PHY_stream_id indicates that the physical layer pipe (PLP) identifier is encoded as a 16-bit uimsbf.

When modulation_system_type is equal to 2, the modulation system type is DVB-C2, and PHY_stream_id indicates that the data slice identifier is encoded in b15 to b8 as an 8-bit uimsbf. The PLP identifier may be encoded in b7 to b0 as an 8-bit uimsbf.

When modulation_system_type is equal to 3, the modulation system type is DVB-NGH, and PHY_stream_id indicates that the PLP identifier is encoded as a 16-bit uimsbf.

Figure 8:
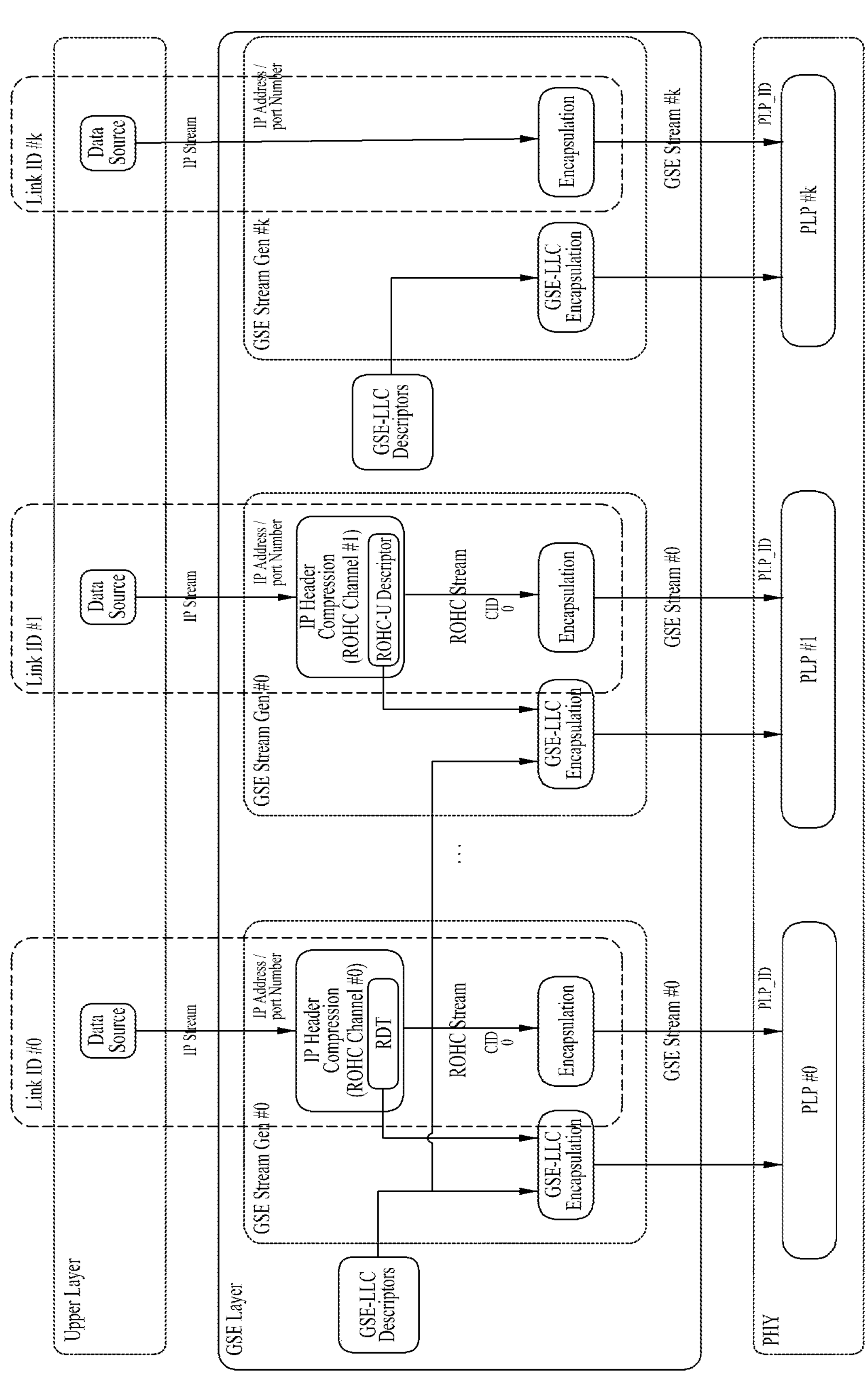
FIG. 8 shows a GSE architecture in a GSE-LLC data model according to embodiments.

FIG. 8 shows a GSE architecture in a GSE-LLC data model according to embodiments.

Upon receiving a data source from the upper layer in the form of an IP stream, the GSE layer may compress the IP header, generate a ROHC stream, and encapsulate the stream into a GSE stream. The GSE stream is transmitted in the physical layer based on the PLP. In addition, the GSE-LLC descriptor and/or the ROHC descriptor, which are signaling information of the GSE layer, may be generated and transmitted through the physical layer based on the PLP. The data source may be assigned identification information by a link ID. The embodiments may further include a GSE layer architecture for multicast.

The method/apparatus according to the embodiments may provide a method of signaling for media delivery in adaptive bitrate multicast network based on unidirectional delivery.

Embodiments may provide a multicast transport session mapping method for adaptive bitrate multicast media delivery in a unidirectional delivery network.

Embodiments may include a streaming identifier for session mapping.

Embodiments may generate signaling information for identifying whether header compression is applied to a multicast stream. Signaling method Embodiments may include a method for transmitting and identifying header compression related context information.

In a unidirectional delivery network such as terrestrial broadcasting or satellite broadcasting, in order to support adaptive bitrate multicast media transmission configured for application to the existing ISP network, a multicast transport session may be mapped to a resource of a unidirectional delivery network. An IP header compression method for efficient bandwidth utilization for multicast media transmission may be applied.

Embodiments define GSE-LLC to support multicast. The embodiments propose a method for generating a descriptor supporting an IP/UDP-based multicast stream with DVB-GSE, generating a descriptor supporting multiple ROHC packet flows in a link, and integrating these descriptors.

In the DVB-NIP system, an IP multicast stream may be transmitted through a broadcasting system such as DVB-T2/S2/S2X. In order to support IP multicast transmission in the DVB physical layer, a multicast list to be transmitted must be connected to a physical layer stream such as PLP or ISI. The UDP port may be used as one of the parameters to identify individual IP multicast streams. However, GSE-LLC currently does not support UDP port related signaling. In addition, ROHC modules should be supported to handle multiple IP streams. Currently, ROHC-U descriptors do not provide sufficient information to perform header compression of multiple IP streams. The embodiments may address this technical issue.

FIG. 9 shows an IP multicast list descriptor according to embodiments.

IP_multicast_list_descriptor according to embodiments delivers an IPV4 multicast list carried on a physical link in interactive_network_id. This descriptor may contain additional information for processing UDP/IPv4 packets carrying multicast in the DVB-GSE layer. This descriptor provides information about the UDP/IPv4 multicast. The descriptor of FIG. 9 may be generated by the GSE layer, the GSE-LLC descriptor generator, the ROHC compressor, or the like of FIGS. 4, 5 and 8.

Transmission of the multicast list descriptor according to the embodiments may be optional according to circumstances.

One instance with the same link_id is allowed in the loop.

When this descriptor is used together with IPv6_multicast_list_descriptor, multicast_stream_id may be unique within the same physical link.

The semantics of the multicast list descriptor is described below.

num_multicasts: This is an 8-bit field indicating the number of multicasts.

multicast_stream_id: This is an 8-bit field for uniquely identifying an IP/UDP multicast stream within a physical link identified by link_id.

source_ip_address: This is a 32-bit field indicating the source IPV4 address of the multicast carried on the physical link identified by link_id.

destination_ip_address: This is a 32-bit field indicating the destination IPv4 address of the multicast carried on the physical link identified by link_id.

source_port: This is a 16-bit field indicating the source UDP port number for the multicast carried on the physical link identified by link_id.

destination_port: This is a 16-bit field indicating the destination UDP port number for the multicast carried on the physical link identified by link_id.

header_compression_flag: This is a 1-bit Boolean field indicating whether header compression is applied to the multicast stream identified by multicast_stream_id. A value of 0 (zero) indicates that the multicast stream is delivered from the DVB-GSE layer without header compression. A value of 1 (one) indicates that header compression is applied to the multicast stream of the DVB-GSE layer. When compressed_flag is equal to 1, the ROHC-U descriptor or ROHC-U_multicast_descriptor is signaled.

reserved_for_future_use: This is a 7-bit field reserved for future use and all bits thereof may be set to 0.

FIG. 10 shows an IPV6 multicast list descriptor according to embodiments.

IPv6_multicast_list_descriptor delivers an IPV4 multicast list carried on the physical link in interactive_network_id. This descriptor also provides additional information for processing UDP/IPv6 packets carrying multicast in the DVB-GSE layer. This descriptor provides information about UDP/IPv6 multicast only. The descriptor of FIG. 10 may be generated by the GSE layer, the GSE-LLC descriptor generator, the ROHC compressor, or the like of FIGS. 4, 5 and 8.

Transmission of this descriptor may be optional.

Only one instance with the same link_id may be allowed in the loop.

When this descriptor is used together with IP_multicast_list_descriptor, multicast_stream_id may be unique within the same physical link.

The semantics of the multicast list descriptor according to the embodiments is described below.

num_multicasts: This is an 8-bit field indicating the number of multicasts.

multicast_stream_id: This is an 8-bit field for uniquely identifying an IP/UDP multicast stream within a physical link identified by link_id.

source_ip_address: This is a 128-bit field indicating the source IPV6 address of the multicast carried on the physical link identified by link_id.

destination_ip_address: This is a 128-bit field indicating the destination IPv6 address of the multicast carried on the physical link identified by link_id.

source_port: This is a 16-bit field indicating the source UDP port number for the multicast carried on the physical link identified by link_id.

destination_port: This is a 16-bit field indicating the destination UDP port number for the multicast carried on the physical link identified by link_id.

header_compression_flag: This is a 1-bit Boolean field indicating whether header compression is applied to the multicast stream identified by multicast_stream_id. A value of 0 (zero) indicates that the multicast stream is delivered from the DVB-GSE layer without header compression. A value of 1 (one) indicates that header compression is applied to the multicast stream of the DVB-GSE layer. When compressed_flag is equal to 1, the ROHC-U descriptor or ROHC-U_multicast_descriptor is signaled.

reserved_for_future_use: This is a 7-bit field reserved for future use and all bits thereof may be set to 0.

FIG. 11 shows a ROHC-U multicast descriptor according to embodiments.

The descriptor of FIG. 11 may be generated by the GSE layer, the GSE-LLC descriptor generator, the ROHC compressor, or the like of FIGS. 4, 5 and 8.

The ROHC-U_multicast_descriptor may deliver configuration parameters for the robust header compression decompressor in the unidirectional mode, as in RFC 3095 for GSE streams using ROHC for IP defined in ETSI TS 102 606-3.

Transmission of the descriptor may be optional. Only one instance with the same link_id may be allowed in the loop.

The ROHC-U and list descriptors may be connected based on multicast_stream_id.

The semantics of the ROHC-U multicast descriptor is described below.

rohc_ch_id: This is a 16-bit field indicating the ROHC channel corresponding to this descriptor. The ROHC channel may be mapped to a physical layer stream. When a single ROHC channel is configured on the physical link, rohc_ch_id may have the same value as link_id. While the conventional descriptor cannot support multiple streams because it does not consider the ROHC channel, embodiments may provide multicast signaling.

max_CID: This is a 7-bit field indicating the maximum value of the context ID (CID) to be used according to the ROHC channel. The max_CID field cannot have a value greater than 127.

IETF RFC 3095 defines that ROHC is encoded using a small or large CID and self-describing variable length encoding (IETF RFC 3095). The field size may be limited to 2 octets. In the DVB-GSE system, a CID value of up to 1 byte may be allowed (ETSI TS 102 606-3).

Adaptation_flag: This is a 1-bit Boolean field indicating whether separate transmission of fixed chain bytes is performed by the Adaptation module on this ROHC channel. The value of 0 (zero) indicates that the Adaptation module cannot perform further operations on the original ROHC packet stream. The value of 1 (one) indicates that static chain byte are extracted by the Adaptation module and transmitted as part of the LLC data. While the prior art applies all ROHC initialization to all contents during multicast, embodiments may selectively perform initialization/compression only for a specific ROHC channel.

num_rohc_flow: This is an 8-bit field indicating the number of following ROHC compressed packet flows.

context_id: This is an 8-bit field indicating the CID of the compressed IP stream. It may be encoded based on IETF RFC 3095.

context_profile: This is an 8-bit field indicating the scope of the protocol used to compress an stream. It may carry the 8 least significant bits of the ROHC profile identifier defined in ETSI TS 102 606-3.

multicast_stream_id: This is an 8-bit field for uniquely identifying an IP/UDP multicast stream within a physical link identified by link_id.

static_chain_length: This is an 8-bit field indicating the length of the static chain byte sequence.

static_chain_byte: This field carries static information used to initialize the ROHC-U decompressor. The size and structure of this field may depend on context_profile.

FIG. 12 shows a ROHC-U descriptor according to embodiments.

The descriptor of FIG. 12 may be generated by the GSE layer, the GSE-LLC descriptor generator, the ROHC compressor, or the like of FIGS. 4, 5 and 8.

This descriptor may deliver configuration parameters for a ROHC decompressor in the unidirectional mode (RFC 3095) of an operation for GSE streams using ROHC for IP according to ETSI TS 102 606-3.

Transmission of this descriptor may be optional.

Only one instance with the same context_id may be allowed in the loop.

The semantics of the ROHC-U descriptor is described below.

rohc_ch_id: This is a 16-bit field indicating the ROHC channel corresponding to this descriptor. The ROHC channel may be mapped to a physical layer stream. When a single ROHC channel is configured on the physical link, rohc_ch_id may have the same value as link_id.

context_id: This is an 8-bit field indicating the CID of the compressed IP stream. It may be encoded based on IETF RFC 3095.

IETF RFC 3095 defines that ROHC is encoded using a small or large CID and self-describing variable length encoding (IETF RFC 3095). The field size may be limited to 2 octets. In the DVB-GSE system, a CID value of up to 1 byte may be allowed (ETSI TS 102 606-3).

context_profile: This is an 8-bit field indicating the scope of the protocol used to compress an stream. It may carry the 8 least significant bits of the ROHC profile identifier defined in section 4.1.1 in ETSI TS 102 606-3.

static_chain_length: This is an 8-bit field indicating the length of the static chain byte sequence.

static_chain_byte: This field carries static information used to initialize the ROHC-U decompressor. The size and structure of this field may depend on context_profile.

Figure 13:
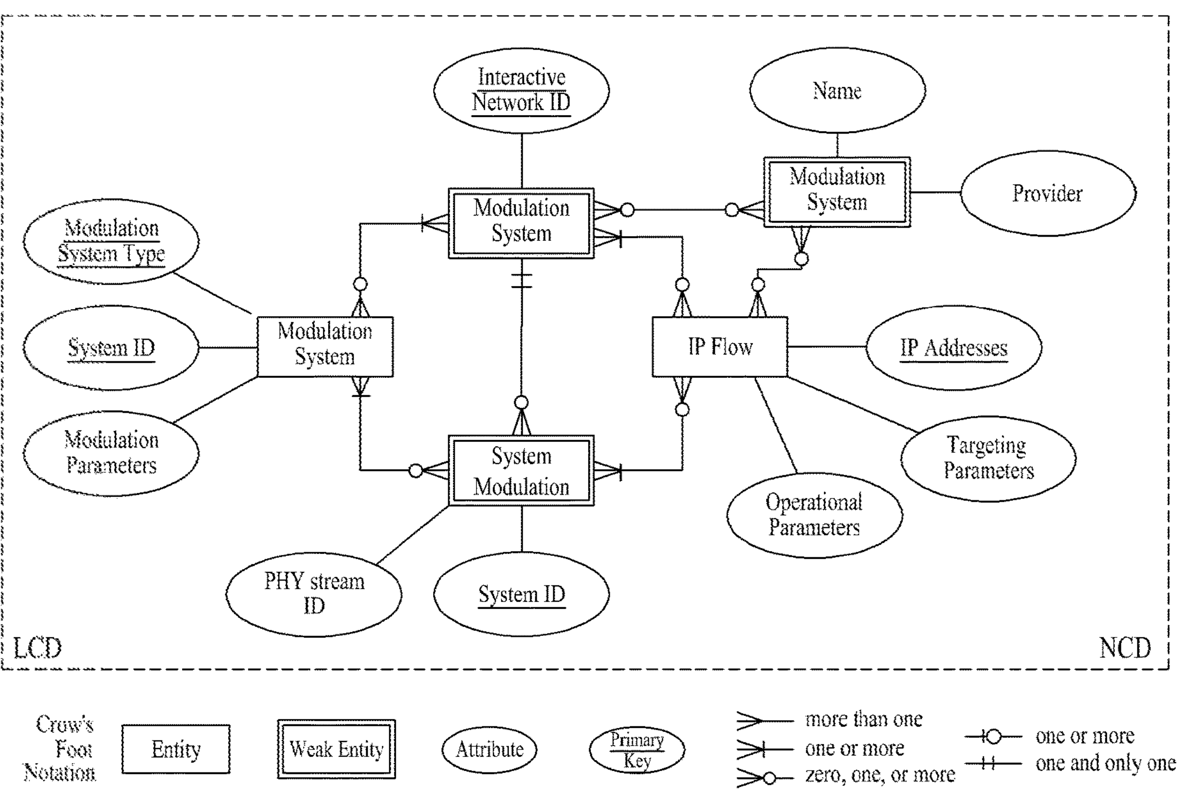
FIG. 13 shows a data model of LLC information according to embodiments.

FIG. 13 shows a data model of LLC information according to embodiments.

The data model of FIG. 13 is an entity-relationship (ER) model based on the syntax and semantics of LLC data and represents a mapping relationship between the LCD and NCD tables.

The entities in this model are described below.

Modulation System: This entity represents the modulation system of RF characterized by its type (e.g., DVB-T2) and system ID (e.g. T2_system_id). This may be further described by a set of modulation parameters (such as frequency).

Link: This entity represents the virtual network interface of the receiver. Therefore, it is connected to one or more IP flows. Because the same data stream may be used in one or more modulation system streams, a link may appear in one or more instances, each of which is associated with one modulation system stream characterized by a modulation system modulation, modulation system ID, and PHY stream ID (e.g., a specific PLP in a specific DVB-T2 system). Because the same data is carried in all instances of a link, the receiver is free to switch between the instances of a specific link, but different paths may lead to different propagation delays applied to the data.

IP Flow: This entity represents a data stream carried via a given link. An IP flow may be associated with one or more links because the same data may be used at different positions. An IP flow is further described through targeting parameters (e.g., description of the IP source and/or destination addresses found in the flow) and operational parameters (e.g., a ROHC-U header compression parameter). The connection between an IP flow and a link is established by Link ID.

Platform: This entity represents a collection of IP flows provided by an operator. The operator may operate one or more IP flows.

In FIG. 13, the LCD may represent an association between the link layer and the physical layer and system parameters, and the NCD may represent IP network related parameters. Based on LCD and NCD, the relationship between layers and a network may be represented.

Figure 14:
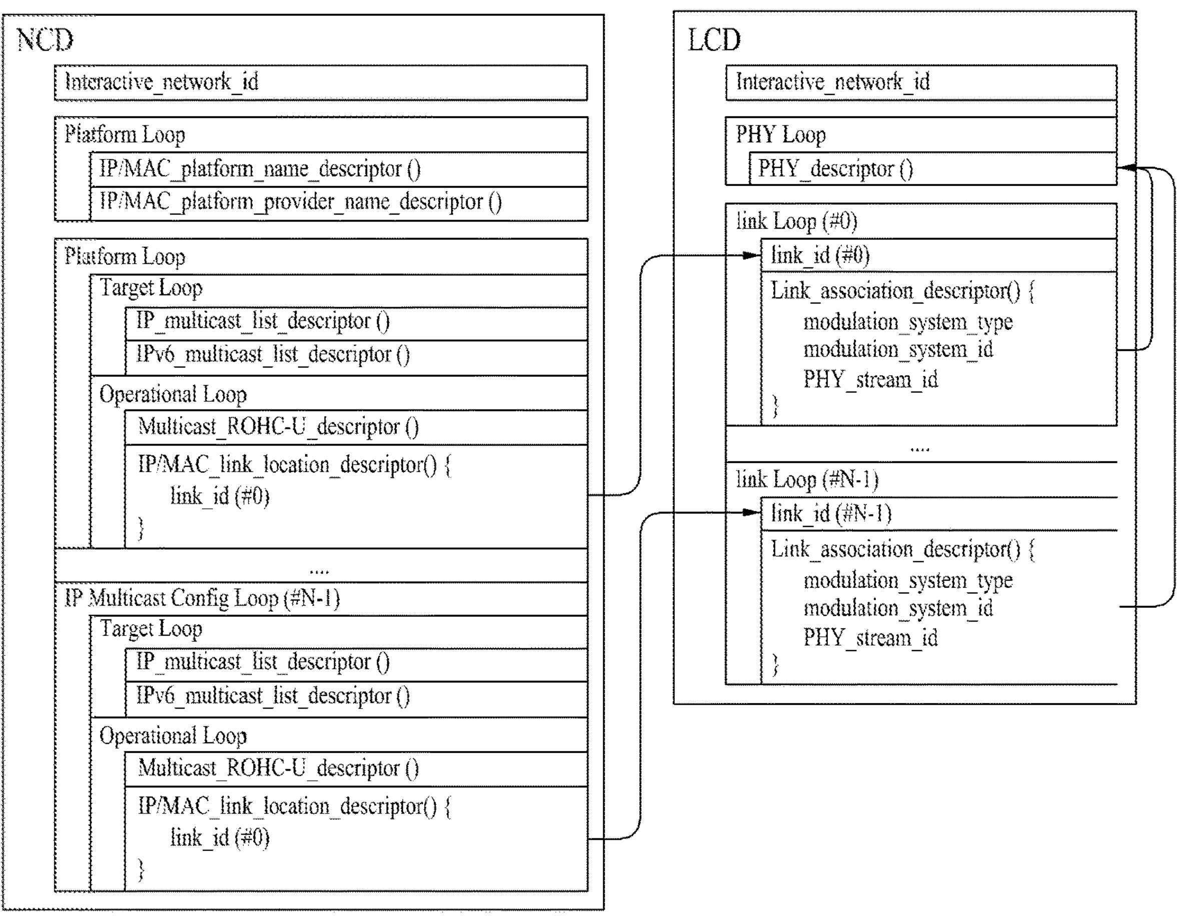
FIG. 14 shows network control data (NCD) and link control data (LCD) according to embodiments.

FIG. 14 shows network control data (NCD) and link control data (LCD) according to embodiments.

Multicast transport may be supported by generating link control data according to embodiments. NCD and LCD for multicast stream transport in DVB-GSE may be generated as shown in FIG. 14.

The NCD may identify a network by Interactive_network_id. Depending on the platform loop, the NCD may include an IP/MAC platform name descriptor and an IP/MAC platform provider name descriptor. For each IP multicast configuration loop, the NCD may include a target loop and an operational loop. The target loop may include an IP multicast list descriptor and an IPV6 multicast list descriptor, and the operational loop may include a multicast ROHC-U descriptor. The IP/MAC link location descriptor may identify a link by link_id. An LCD reference relationship may be indicated based on the link_id.

The LCD may identify a network by Interactive_network_id. The LCD may include a physical loop for the physical layer and a link loop for the link layer. The physical loop may include a physical descriptor. The link loop may include link association information for each link ID. The link association descriptor may include a modulation system type, a modulation system ID, and a physical stream ID.

The method/apparatus according to the embodiments may provide updated GSE-ROHC for multicast support.

The ROHC module may support processing of multiple IP streams. The ROHC descriptor according to the embodiments may further include information for performing header compression of multiple IP streams. Accordingly, unlike the conventional technology, multiple IP streams may be efficiently processed based on the ROHC descriptor. To present a more detailed description of the ROHC channel, an additional ROHC association descriptor, a CID space limit for optimized implementation, and conditional use of an Adaptation module based on LLC data path configuration may be additionally used.

ROCH parameters according to the embodiments are described below.

The ROHC framework defines per-channel configuration parameters that are configured in a coherent way in the compressor and decompressor to allow them to interoperate (see section 5.1.1 of RFC 3095). To ensure interoperability between compressors and decompressors for DVB-GSE, the following rules apply.

MAX_CID: This parameter indicates the maximum CID value that is in use. The parameter MAX_CID may be inferred from the context_id field of the ROHC-U descriptor in GSE LLC. TS 102 606-2. When the ROHC is applied to a multicast IP stream, the parameter MAX_CID may be signaled by the max_CID field of the ROHC-U multicast descriptor in GSE LLC. TS 102 606-2.

LARGE_CIDS: The value of this Boolean parameter may be inferred from the context_id field of the ROHC-U descriptor in GSE LLC. TS 102 606-2. When the ROHC is applied to a multicast IP stream, the parameter LARGE_CIDS may be inferred from the max_CID field of the multicast ROHC-U descriptor in GSE LLC, TS 102 606-2. When max_CID is less than or equal to '15', LARGE_CIDS may be considered as 'FALSE'. When max_CID is greater than '15', the decompressor may consider LARGE_CIDS as 'TRUE'.

Profile: This is a profile identifier (see section 4.1.1) that indicates a profile used by the compressor. For a list of profiles, reference may be made to section 4.1.1. The parameter PROFILES may be conveyed in the context_profile field of the ROHC-U descriptor or ROHC-U_multicast descriptor of GSE LLC, TS 102 606-2.

FEEDBACK_FOR: This parameter may not be used.

MRRU: Segmentation shall not be used.

ROHC rules according to embodiments are described below.

DVB-GSE may apply additional rules to the operation of the ROHC framework.

When any change in the static fields of the input IP stream is detected and the entire context in the ROHC channel needs to be initialized by the ROHC compressor, the ROHC compressor shall perform context re-initialization. The CONTEXT_REINITIALIZATION signal is triggered as described in section 6.3.1 of RFC 3095, and a new value of the CID shall assigned to the compressed IP stream. The new CID value is unique to the ROHC channel and shall not be used by any other instance of ROHC compressors operating on the ROHC channel.

When multiple IP streams are compressed on the same ROHC channel, a different CID is assigned to each compressed stream. In this case, when any change in the static fields of an individual IP stream is detected by the ROHC compressor of the ROHC channel, a new value of the CID is assigned to the compressed IP stream. The new CID value is unique to the ROHC channel and shall not be used by any other instance of ROHC compressors operating on the ROHC channel.

Any ROHC compressor and decompressor used with DVB-GSE operate in the unidirectional mode as described in RFC 3095.

A small CID or a large CID may be configured on each ROHC channel as described in section 5.1.3 of RFC 3095. When a large CID is used on the ROHC channel, only the 1-byte large CID may be configured for DVB-GSE. Therefore, the maximum value of CID that may be assigned to a compressed IP stream is 127, and up to 128 compressed flows are allowed on each ROHC channel for DVB-GSE (see section 4.5.6 of RFC 3095).

The Adaptation module according to the embodiments is configured as follows.

The Adaptation module inserts necessary decompressor configuration parameters into the ROHC-U descriptor or ROHC-U multicast descriptor in the LLC data and conveys the same to the receiver (sec TS 102 606-2). Thereby, the impact of the header compression mechanism on the zapping delay may be minimized and robustness of compressed flows to the error may be improved.

If LLC data is conveyed on the same path with the ROHC packet flow, no additional operation may be performed on the original ROHC packet stream by the Adaptation module. The Adaptation module may operate as a buffer and there is no static chain byte in the LLC data. In this case, the adaptation_flag field in the ROHC-U multicast descriptor shall be set to '0'.

If the separated LLC data path is present outside the ROHC packet flow, the static chain byte may be extracted and configured as part of the LLC data by the Adaptation module on the compressor side. The static chain byte may be merged with the ROHC compressed flow by the Adaptation module on the decompressor side. In this case, the adaptation_flag field of the ROHC-U multicast descriptor containing the static chain byte is set to '1'. On/off for multicast may be signaled.

The following operations are performed on the compressor side according to the embodiments.

The Adaptation module shall extract the static chain byte (see section 5.7.7.1 of RFC 3095) from each IR packet transmitted in the ROHC compressed data flow. After extracting the static chain bytes, each IR packet shall be converted into an IR-DYN packet type by the Adaptation module. The newly created IR-DYN packet shall be transmitted inside the ROHC compressed flow, replacing the original IR packet. The extracted static chain data shall be transmitted together with signaling data outside the ROHC compressed flow as specified in TS 102 606-2.

Operations on the decompressor side according to the embodiments are performed as follows.

The Adaptation module detects IR-DYN type packets in the ROHC compressed data flow. All IR-DYN packets from the received data flow are converted to IR packet type by the Adaptation module, using the corresponding static chain bytes received in the GSE LLC signaling. The newly created IR packet shall be transmitted in the ROHC compressed flow, replacing the original IR-DYN packet.

Transport in DVB-GSE according to embodiments is operated as follows.

Protocols carried in GSE streams are identified by the Protocol_Type field in the GSE header TS 102 606-1. GSE streams carrying the ROHC-U compressed IP streams use the EtherType value assigned by IEEE to Robust Header Compression according to RFC 3095 in the Protocol_Type field of the GSE header.

To enable receivers to correctly process GSE streams carrying ROHC-U compressed IP streams, the ROHC-U descriptor or the ROHC-U multicast descriptor may be transmitted in the LLC data as defined in TS 102 606-2.

GSE updates for the native IP system according to the embodiments are described below.

Figure 15:
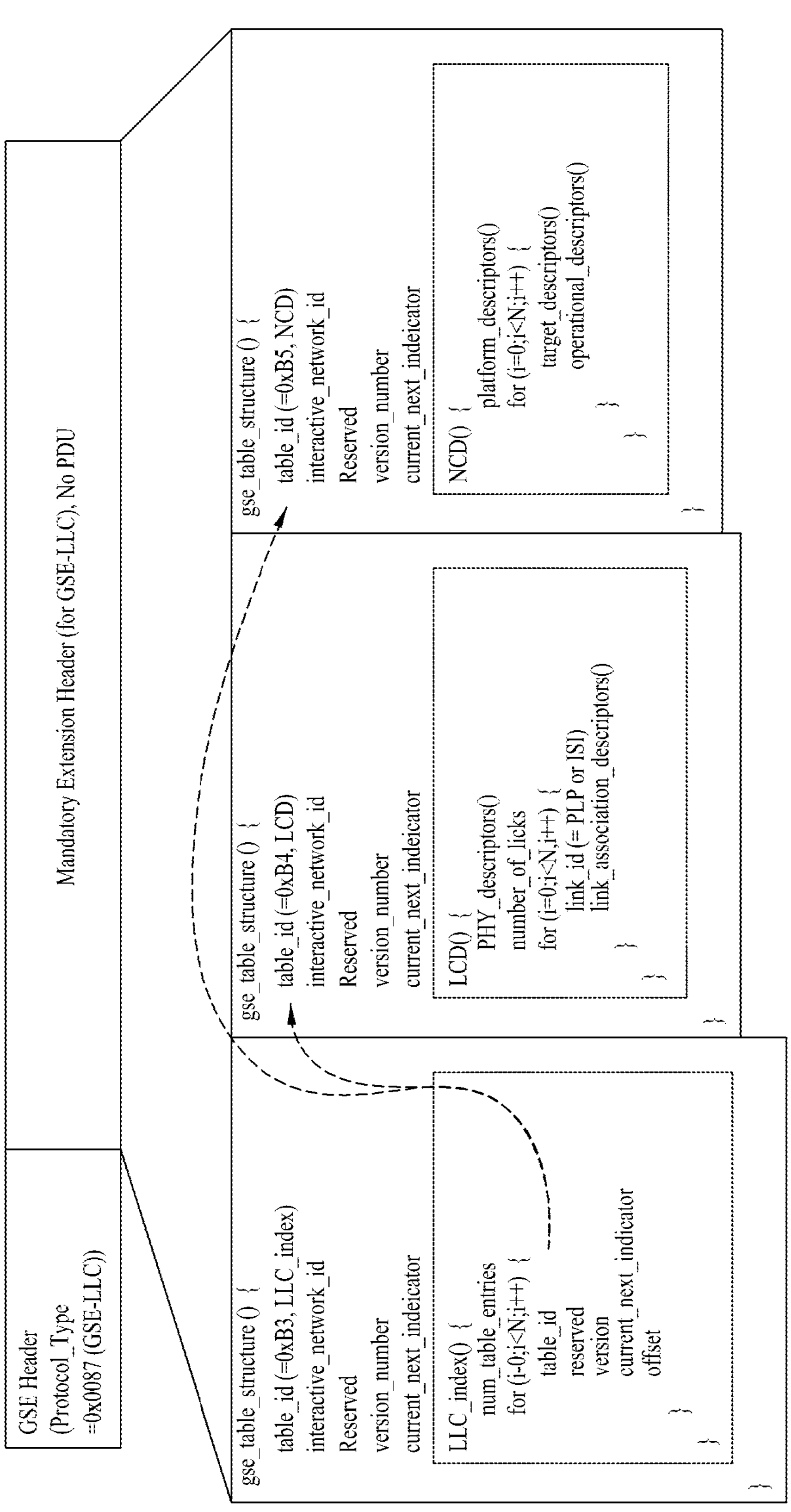
FIG. 15 shows GSE-LLC according to embodiments.

FIG. 15 shows GSE-LLC according to embodiments.

The structure of the GSE-LLC may include a GSE header and a GSE header extension. The GSE header may indicate GSE-LLC when the Protocol Type has a value of 0x0087. The header extension is extended for GSE-LLC, and may have no PDU. The extended header may include a GSE table structure.

The GSE table structure may include table_id. When table_id is 0x83, it indicates LLC_index. When table_id is 0x84, it indicates LCD. When table_id is 0x85, it indicates NCD. The GSE table structure may include interactive_network_id, version_number, and current_next_indicator.

LLC_index may include information on the number of table entries and also include table_id, version, current_next_indicator, and offset information for each table entry.

The LCD may include a physical descriptor, the number of links, a link ID for each link, and a link association descriptor. The link ID may be PLP or ISI of the physical layer.

The NCD may include a platform descriptor, and also include a target descriptor and an operational descriptor according to each platform.

Referring to FIGS. 9 to 11, regarding GSE updates for a native IP system, GSE multicast may be processed using IP multicast descriptors (IPv4 and IPV6) and ROHC-U multicast descriptors.

Figure 16:
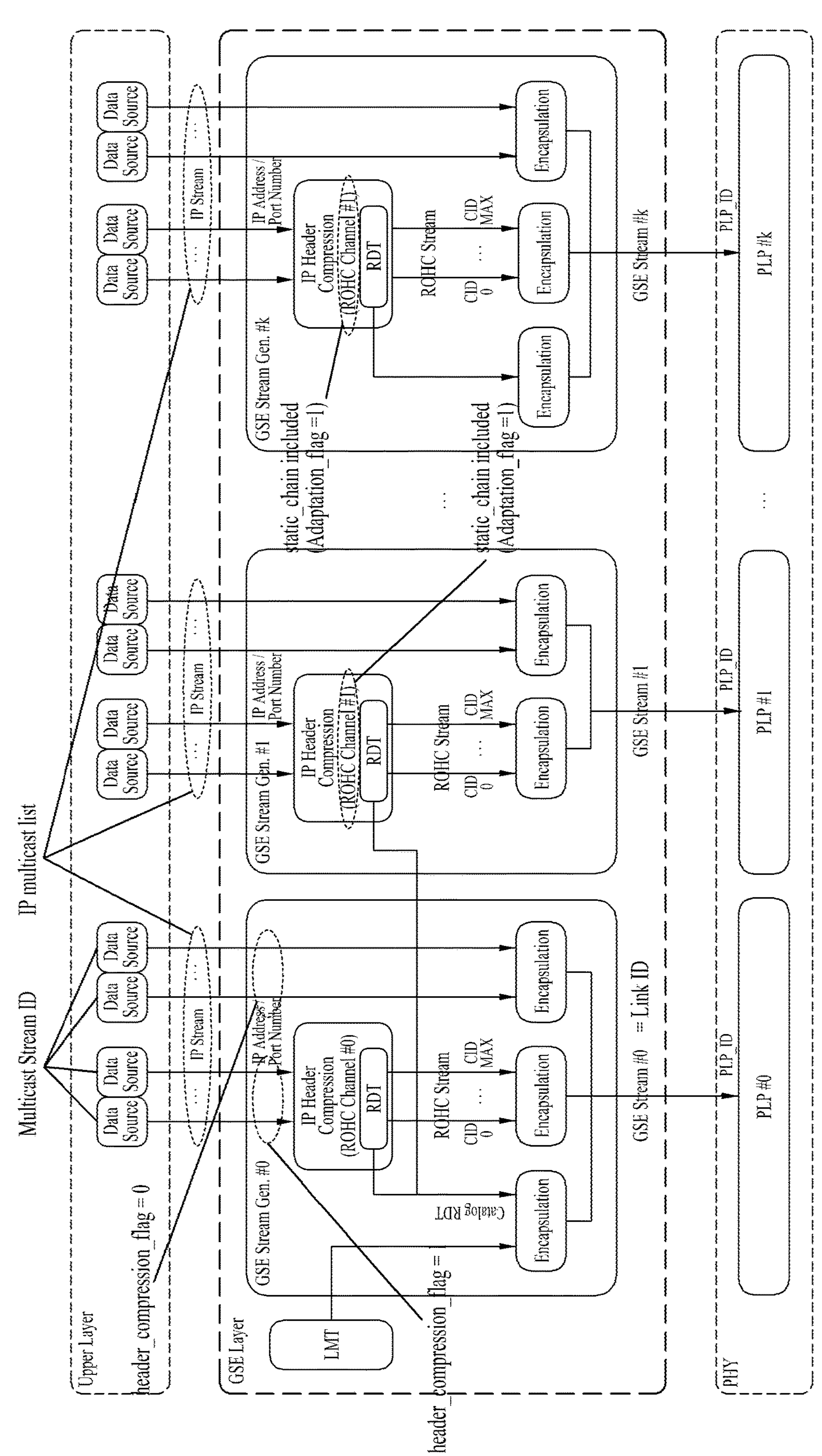
FIG. 16 shows a GSE layer architecture for multicast according to embodiments.

FIG. 16 shows a GSE layer architecture for multicast according to embodiments.

Multicast may be processed through GSE-LLC (IP multicast descriptors (IPv4 and IPv6) and ROHC-U multicast descriptors) according to the embodiments. The data source received from the upper layer is delivered in the form of an IP stream. IP streams containing data sources may be assigned a multicast stream ID. The IP multicast list may represent multiple IP streams.

The GSE layer may receive a multicast stream, perform IP header compression, and generate and encapsulate GSE signaling information. When the header compression flag is 1, the IP header may be compressed. When the adaptation flag is 0, the static chain may not be included in the ROHC-U descriptor, which is context information. When the adaptation flag is 1, the static chain may be included.

The GSE-LLC descriptor may contain the information of FIGS. 9 to 11, and may be encapsulated in a GSE-LLC packet and be delivered to the physical layer as a GSE stream. A GSE stream may be identified by a link ID.

The receiver may acquire multicast media by a PLP ID, a link ID, and a multicast stream ID.

Also, as shown in FIG. 14, the receiver may recognize the mapping relationship of multicast media using LLC tables including NCD and LCD for IP multicast stream. The NCD and LCD may also be delivered to the physical layer through the GSE signaling information.

Figure 17:
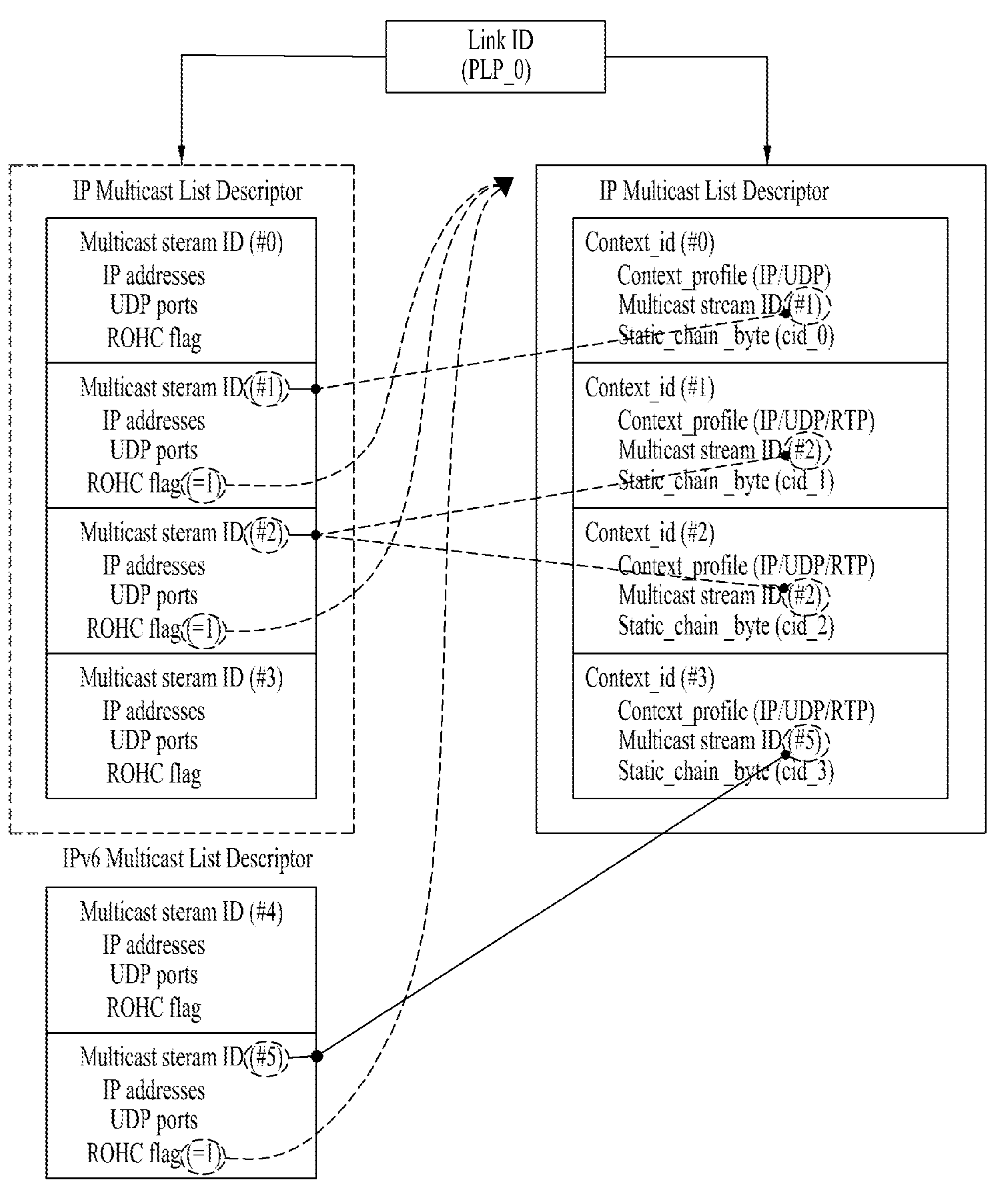
FIG. 17 shows an example of NCD for multicast of ROHC according to embodiments.

FIG. 17 shows an example of NCD for multicast of ROHC according to embodiments.

FIG. 17 shows an example of NCD in GSE-LLC.

The IP multicast list descriptor and the ROHC-U multicast descriptor may be referenced by each other through the link ID and the PLP ID.

The IP multicast list descriptor may contain path information about a multicast stream identified by a multicast stream ID. For example, it may contain IP addresses, UDP ports, and a ROHC flag as information. When the ROHC flag is 1, additional information about the ROHC may be delivered through the ROHC-U multicast descriptor. The ROHC-U multicast descriptor may include configuration parameters related to a context identified by a context ID. For example, it may include a context profile, a multicast stream ID, and a static chain byte according to a CID. Multicast media may be transmitted through the link ID, multicast stream ID, ROHC information, and the like, and multicast GSE signaling mapping information may be efficiently delivered.

The GSE for NIP may provide the following GSE-LLC.

The multicast list descriptor may provide multicast mapping information, and in particular, indicate multicast mapping through UDP port information. Mappings between multicast and link IDs may be created.

The ROHC-U descriptor provides information for multiple streams and UDP. It may be associated with other signaling tables. A mapping between multicast, ROHC channel, context ID, and context information may be created.

The data model may support multiple IP streams.

FIG. 18 shows a ROHC profile for DVB-GSE according to embodiments. The ROHC profile may include RTP/UDP/IP, UDP/IP, ESP/IP, and IP.

The header compression algorithm may be executed based on a ROUTE/FLUTE protocol over UDP/IP. RTP and ESP may be used. Minimizing the use of the protocol may simplify complex implementations.

In order to support multiple IP streams, the condition under which the ROHC compressor triggers context re-initialization (the condition that any change in the static fields of the IP stream is detected by the ROHC compressor) may be removed.

The Adaptation module may correspond to an additional process after the ROHC compressor. For example, the static chain byte may be extracted from an IR packet and the IP packet may be converted into an IR-DYN packet. Signalling data may be transmitted outside the ROHC compressor flow (GSE-LLC).

Depending on whether the Adaptation module is used, individual transmission of context information may be useful in the structure of multiple PLPs, due to the error-robustness transmission of signaling data. The advantage of using the Adaptation module may be diminished if the context data and the corresponding ROHC flow are transmitted over the same PLP.

Figure 19:
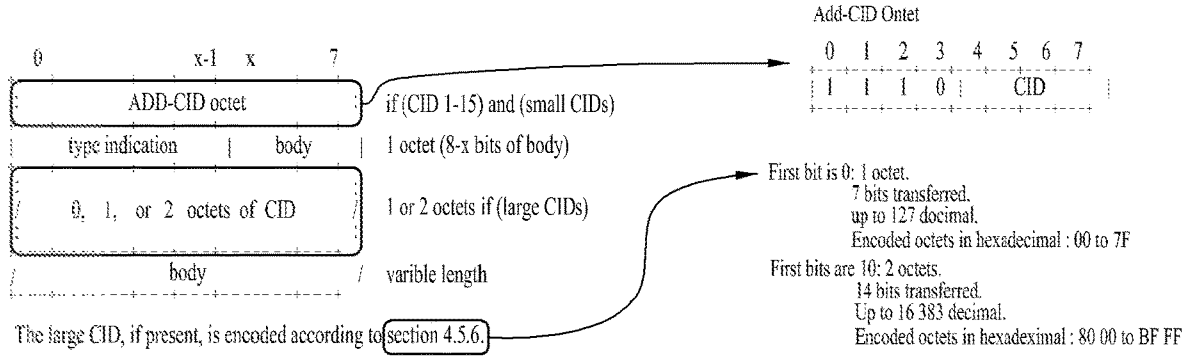
FIG. 19 shows a ROHC packet according to embodiments.

FIG. 19 shows a ROHC packet according to embodiments.

A ROHC packet in an IP flow for a GSE stream may be configured as shown in FIG. 19. The packet may include a CID, a type indication, and a body. The CID may have a small value or a large value. The small CIDs may be CIDs 1 to 15, and the large CIDs may be 1 or 2 octets. When the first bit is 0, it is 1 octet. 7 bytes may be transmitted, and up to 127 decimals may be expressed. Encoded octets are represented as 00 to 7F in hexadecimal. When the first bit is 10, it is 2 octets. Also, 14 bits are transmitted and have up to 16383 decimals. The encoded octets are represented as 00 to BF FF in hexadecimal.

In the case of the small CID, up to 16 ROHC packet flows may be transmitted on the ROHC channel (CID=0 to 15). In the case of a 1-byte large CID, up to 128 ROHC packet flows may be transmitted on the ROHC channel (CID-0 to 127). In the case of a 2-byte large CID, up to 16384 ROHC packet flows may be transmitted on the ROHC channel (CID=0 to 16383).

Regarding channel parameters contained in the ROHC-U descriptor, maxCID may be signaled for each ROCH channel. MaxCID may be represented as a positive integer and indicate the maximum number of context IDs used by the compressor. It may be a large CID.

The field related to the CID may be controlled in 1 byte when the number of ROHC packet flows is less than or equal to 128. The number of IP flows may be greater than the number of ROHC packet flows. Uncompressed IP flows may also be considered. For ATSC 3.0, the maximum number of IP/UDP flows per PLP may be 128. One-byte signaling may be used for the number of multicasts. Small CIDs and large CIDs may be used.

For data transmitted separately, such as signaling data, the ROHC may not be applied to the IP stream. The ROHC selection method may be indicated by a signaling parameter.

There may be a bootstrapping procedure in the link layer. By receiving the GSE stream, the requested IP/UDP stream may be filtered.

For IP level signaling transport, NIF and SIF transmission to which IP encapsulation is applied may be required. A unidirectional DVB-I service list may be transmitted when the Internet is not connected. A dedicated IP address may be used. For example, a dedicated IP address and port may be used in ATSC3.0 signaling. A common bit stream may be added to represent a signaling table. DVB may also have a dedicated address for DVB service discovery. For example, the dedicated address may be https://www.iana.org/assignments/multicast-addresses/multicast-addresses.xhtml.

FIG. 20 shows an IP/UDP packet according to embodiments.

A packet may include an IP header, a UDP header, a common bit stream indicator including a signaling file ID, and a signaling file including a DVB-I service list, an NIF (Network Information File), and an SIF (Service Information File).

Figure 21:
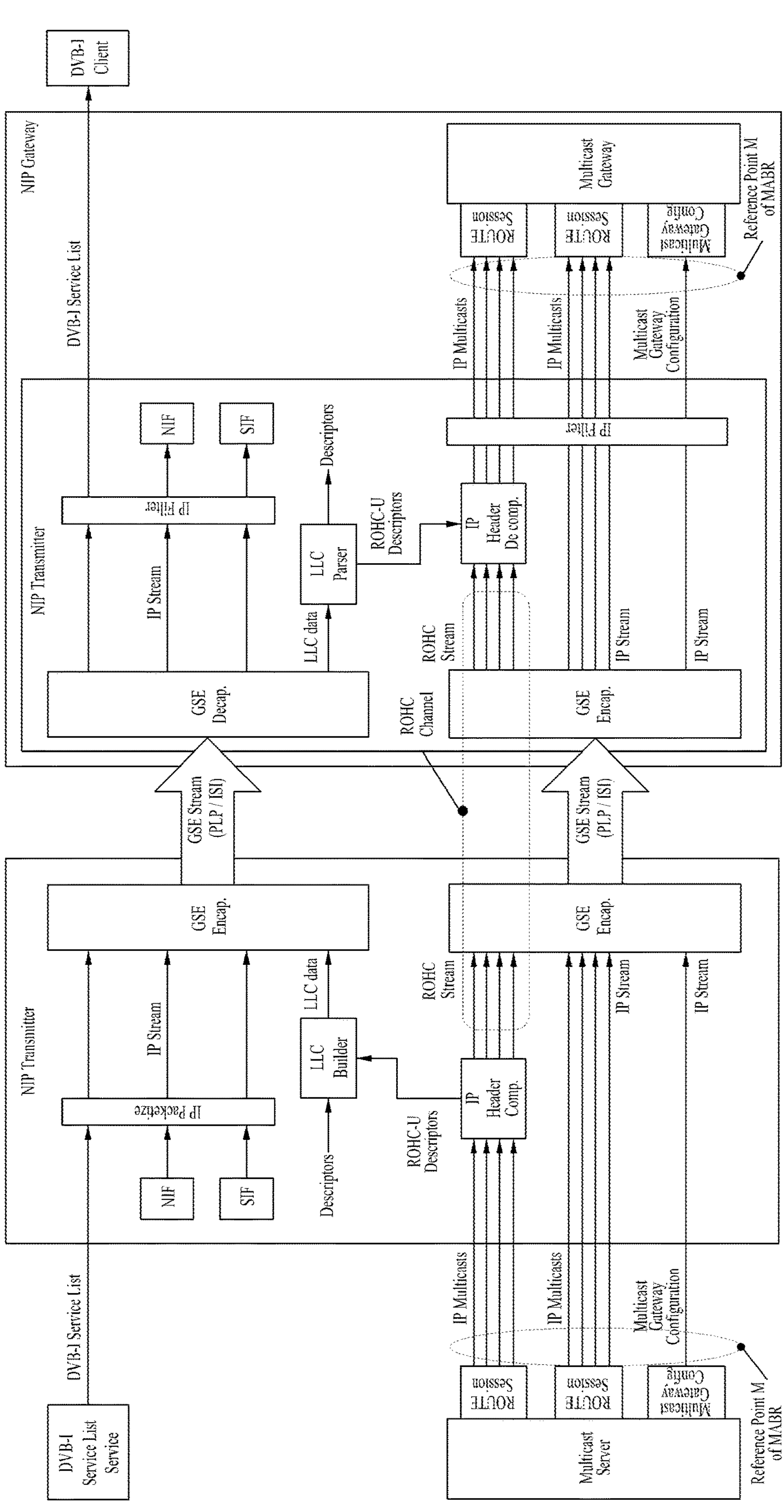
FIG. 21 shows a data flow model according to embodiments.

FIG. 21 shows a data flow model according to embodiments.

FIG. 21 shows a data flow through the GSE.

The transmitter may perform service discovery by receiving the service list from the DVB-I service list server. The IP packetizer of the transmitter may create a packet for a service list, NIF, and SIF. The IP stream including the IP packet may be encapsulated with GSE-LLC information by the GSE encapsulator.

Based on the MABR structure, the multicast server may deliver IP multicast media and multicast gateway configuration information, such as ROUTE session and multicast gateway configuration, to the transmitter. The transmitter may compress the IP header in the GSE layer. It may create a header compression-related ROHC-U descriptor, configure a GSE descriptor, a ROHC-U descriptor, and the like as LLC and perform GSE encapsulation. The GSE stream may be transmitted in the physical layer by the PLP. The ROHC-compressed ROHC stream and the IP streams, which are not ROHC-compressed, may be GSE-encapsulated and transmitted through the PLP.

The gateway may include a receiver. The receiver may receive and decapsulate the GSE stream. The IP stream and LLC data included in the GSE stream may be parsed by the IP filter and LLC parser, respectively. The service list included in the GSE stream may be delivered to the DVB-I client and used for service discovery. The NIF and SIF included in the GSE stream may be parsed. The LLC parser may parse the ROHC-U descriptor and GSE-LLC information.

The GSE stream including the ROCH compressed data on the ROHC channel is parsed into a ROCH stream by the GSE decapsulator. The IP header may be reconstructed by the IP header decompressor. The multicast gateway may parse IP multicast and multicast gateway configuration information.

The receiver may provide multicast media services.

Figure 22:
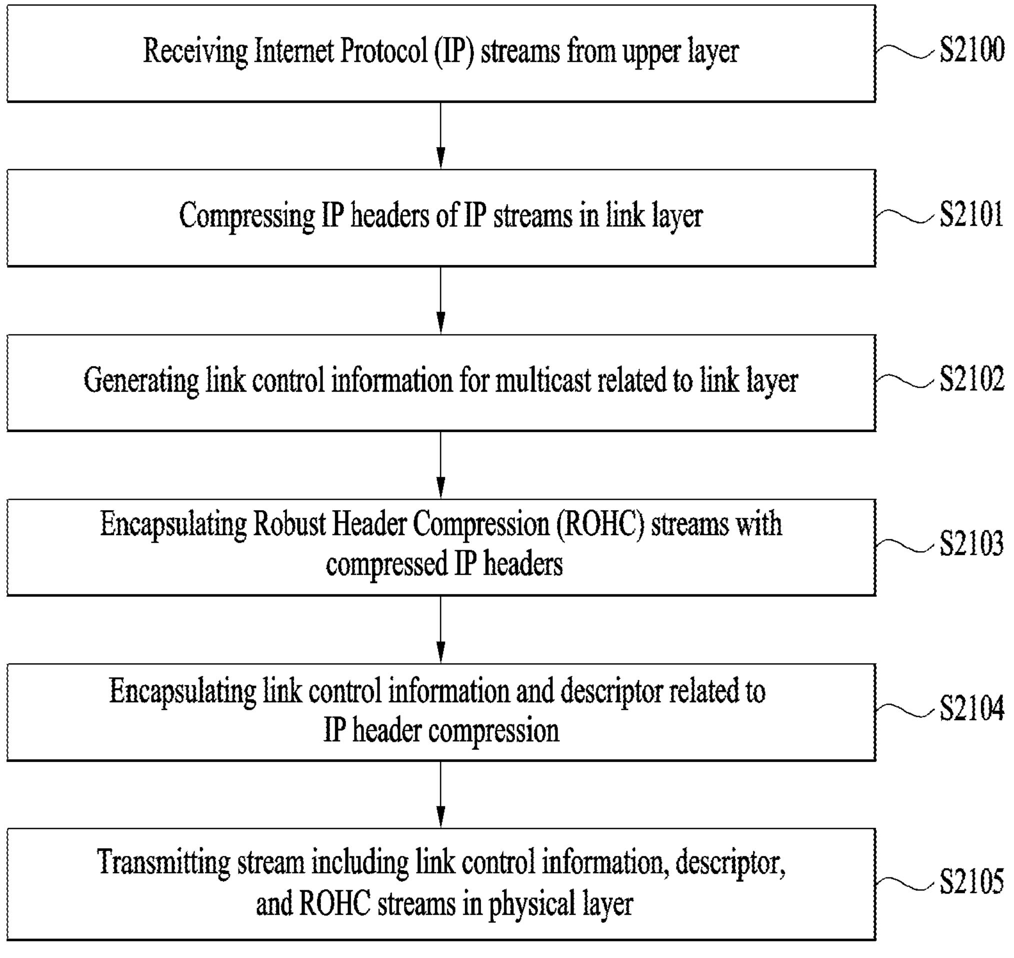
FIG. 22 shows a method for transmitting a multicast signal according to embodiments.

FIG. 22 shows a method for transmitting a multicast signal according to embodiments.

S2100: The multicast signal transmission method according to the embodiments may include receiving Internet Protocol (IP) streams from an upper layer. According to the system and layer architecture as illustrated in FIGS. 4, 5, 8, 16, and the like, upper layer data may be received in a link layer (GSE).

S2101: The multicast signal transmission method may further include compressing IP headers of the IP streams in the link layer. The IP headers according to FIGS. 1A, 1B, 1C, 1D, 2, 4, 5, 8, 16, 21, and the like may be compressed. Multiple IP streams for multicast may be compressed, and signaling information for compression and reconstruction may be generated.

S2102: The multicast signal transmission method may further include generating link control information for multicast related to the link layer. Signaling information for compression and reconstruction may be generated according to FIGS. 1A, 1B, 1C, 1D, 2, 3, 4, 5, 6, 7, 8, 9-15, 16, 17, 18, 21, and the like.

S2103: The multicast signal transmission method may further include encapsulating Robust Header Compression (ROHC) streams with the compressed IP headers. A GSE stream according to FIGS. 1A, 1B, 1C, 1D, 2, 4, 5, 8, 16, 21, and the like may be generated and transmitted to a physical layer.

S2104: The multicast signal transmission method may further include encapsulating a descriptor related to IP header compression and the link control information. A GSE stream according to FIGS. 1A, 1B, 1C, 1D, 2, 4, 5, 8, 16, 21, and the like may be generated and transmitted to the physical layer.

S2105: The multicast signal transmission method may further include transmitting a stream including the link control information, the descriptor, and the ROHC streams in the physical layer. The GSE layer and the physical layer may be mapped, and thus the GSE stream may be transmitted through a PLP.

Figure 23:
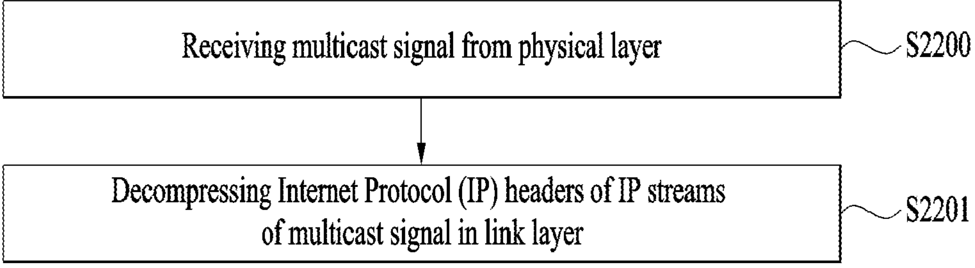
FIG. 23 shows a method for receiving a multicast signal according to embodiments.

FIG. 23 shows a method for receiving a multicast signal according to embodiments.

S2200: The multicast signal reception method according to the embodiments may include receiving a multicast signal from a physical layer. Data may be received according to the system and layer architecture as illustrated in FIGS. 4, 5, 8, 16, and the like.

S2201: The multicast signal reception method may further include decompressing Internet Protocol (IP) headers of IP streams of the multicast signal in a link layer. Decompression according to FIGS. 1A, 1B, 1C, 1D, 2, 4, 5, 8, 16, and 21 may be included.

Referring to FIG. 5, regarding the operations of the GSE layer (which may be referred to as a link layer or the like), the multicast signal transmission method according to the embodiments may include receiving Internet Protocol (IP) streams from an upper layer; compressing IP headers of the IP streams in a link layer; generating link control information for multicast related to the link layer; encapsulating Robust Header Compression (ROHC) streams with the compressed IP headers; encapsulating a descriptor related to IP header compression and the link control information; and transmitting a stream including the link control information, the descriptor, and the ROHC streams in a physical layer.

Referring to FIGS. 7 and 8, in order to support ROHC channel mapping through channel parameters, the link control information may include a link ID, and the stream may be identified by a link ID. The link control information may be mapped to a ROHC channel ID.

Referring to FIG. 1, regarding a context and context ID (CID) assignment, a CID) may be assigned to the IP streams.

Referring to FIG. 6, regarding the ROHC-U descriptor information for multicast, the descriptor may include information for multicast. The descriptor may include identification information for a ROHC channel, a maximum value of a context ID for the ROCH channel, the context ID, and a static chain byte length.

Referring to FIG. 9, regarding the IP multicast list descriptor, the link control information may further include an IP multicast list descriptor. The IP multicast list descriptor may include multicast information according to one link ID. The IP multicast list descriptor may include a multicast stream ID, a source address, a destination address, and header compression related information.

Referring to FIG. 5, regarding the ROHC operation according to the embodiments, the compressing of the IP headers of the IP streams may include:

based on static fields in the IP streams being changed, initializing a context of a ROHC channel by a ROHC compressor; newly assigning a context ID for the ROHC channel; and based on multiple IP streams being compressed on the same ROHC channel, assigning different context IDs to the compressed streams.

Referring to FIGS. 5, 11, and 16, regarding the Adaptation module, the descriptor may include information about transmission of a static chain byte by adaptation of a ROHC channel. Based on the information about the transmission of the static chain byte including a first value, the first value may indicate that the static chain byte is extracted from the IP streams and included in the link control information. Based on the information about the transmission of the static chain byte including a second value, the second value may indicate that any additional operation for the IP streams is skipped, and that the static chain byte is not included in the link control information.

A multicast signal transmission apparatus for performing the multicast signal transmission method may include: a receiver configured to receive Internet Protocol (IP) streams from an upper layer; and a compressor configured to compress IP headers of the IP streams in a link layer. The compressor may be configured to generate link control information for multicast related to the link layer, encapsulate robust header compression (ROHC) streams with the compressed IP headers, encapsulate a descriptor related to IP header compression and the link control information, and transmit a stream including the link control information, the descriptor, and the ROHC streams in a physical layer.

Referring to FIG. 2, a multicast signal reception method corresponding to the reverse process of the transmission method may include: receiving a multicast signal from a physical layer; decompressing Internet Protocol (IP) headers of IP streams of the multicast signal in a link layer; parsing link control information for multicast and a descriptor related to IP header compression; and decapsulating IP header-compressed Robust Header Compression (ROHC) streams.

A multicast signal reception apparatus for performing the multicast signal reception method may include: a receiver configured to receive a multicast signal from a physical layer; and a decompressor configured to decompress Internet Protocol (IP) headers of IP streams of the multicast signal in a link layer. Link control information for multicast and a descriptor related to IP header compression may be parsed, and IP header-compressed Robust Header Compression (ROHC) streams may be decapsulated.

Thereby, the embodiments may address the issue of the limitation that the GSE protocol used for IP-based multicast transmission in the DVB broadcasting system is suitable for a single stream. Since the system considered in TM-NIP is a system capable of supporting transmission of multiple multicast streams over a broadcasting network, optimized embodiments may transmit and receive multicast streams. Embodiments may transmit multiple multicast streams while maintaining compatibility with an existing system.

To this end, embodiments may include a Multicast Transport Session mapping method for adaptive bitrate multicast media transmission in a unidirectional delivery network, a streaming identifier for session mapping, signaling for identifying whether header compression is applied to a multicast stream, a method for transmitting and identifying header compression related context information, and signaling for selective use and identification of an Adaptation module when header compression is used.

Accordingly, in a unidirectional delivery network such as a terrestrial broadcast network or satellite broadcast network, in order to support adaptive bitrate multicast media transmission configured for application to an existing ISP network, a multicast transport session may be mapped to a resource of the unidirectional delivery network. When the unidirectional delivery network is applied to the interface between the multicast server and the multicast gateway, transparent transmission may be supported.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications may be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in the present disclosure may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method for transmitting multicast internet protocol (IP) streams for Multicast Adaptive Bit Rate (MABR) signaling, the method comprising:

- receiving the multicast IP streams, the multicast IP streams being identified based on a Multicast Stream identifier (ID);
- compressing IP headers of the multicast IP streams in a link layer;
- generating link control information for a multicast related to the link layer;

encapsulating Robust Header Compression (ROHC) streams with the compressed IP headers;

encapsulating a descriptor related to IP header compression and the link control information; and transmitting a Generic Stream Encapsulation (GSE) stream in a physical layer, the GSE stream including the link control information, the descriptor, and the ROHC streams, wherein a Context ID (CID) is assigned for each multicast IP stream of the multicast IP streams based on a source IP address, a destination IP address, a source User Datagram Protocol (UDP) port and a destination UDP port, wherein the CID is managed separately for each GSE stream of a plurality of GSE streams, wherein the link control information includes a link ID, wherein the Link ID is mapped to a ROHC channel ID, and wherein the descriptor includes identification information for a ROHC channel, a maximum value of a context ID for the ROHC channel, the context ID, and a static chain byte length.

2. The method of claim 1, wherein the link control information further includes an IP multicast list descriptor, wherein the IP multicast list descriptor carries multicast information based on a link ID, and wherein the IP multicast list descriptor includes a multicast stream ID, a source address, a destination address, and header compression related information.

3. The method of claim 1, wherein the compressing of the IP headers of the IP streams comprises:

based on static fields in the IP streams being changed, initializing a context of a ROHC channel by a ROHC compressor;

newly assigning a context ID for the ROHC channel; and based on multiple IP streams being compressed on the same ROHC channel, assigning different context IDs to the compressed streams.

4. The method of claim 1, wherein the descriptor includes information about transmission of a static chain byte by adaptation of a ROHC channel, wherein, based on the information about the transmission of the static chain byte including a first value, the first value indicates that the static chain byte is extracted from the IP streams and included in the link control information, and wherein, based on the information about the transmission of the static chain byte including a second value, the second value indicates that any additional operation for the IP streams is skipped, and that the static chain byte is not included in the link control information.

5. An apparatus for transmitting multicast internet protocol (IP streams for Multicast Adaptive Bit Rate (MABR) signaling, comprising:

a memory; and a processor connected to the memory, the processor configured to:

receive the multicast IP streams, the multicast IP streams being identified based on a Multicast Stream identifier (ID); and compress IP headers of the multicast IP streams in a link layer, generate link control information for a multicast related to the link layer;

encapsulate robust header compression (ROHC) streams with the compressed IP headers;

encapsulate a descriptor related to IP header compression and the link control information; and transmit a Generic Stream Encapsulation (GSE) stream in a physical layer, the GSE stream including the link control information, the descriptor, and the ROHC streams, wherein a Context ID (CID) is assigned for each multicast IP stream of the multicast IP streams based on a source IP address, a destination IP address, a source User Datagram Protocol (UDP) port and a destination UDP port, wherein the CID is managed separately for each GSE stream of a plurality of GSE streams, wherein the link control information includes a link ID, wherein the Link ID is mapped to a ROHC channel ID, and wherein the descriptor includes identification information for a ROHC channel, a maximum value of a context ID for the ROHC channel, the context ID, and a static chain byte length.

6. The apparatus of claim 5, wherein the link control information further includes an IP multicast list descriptor, wherein the IP multicast list descriptor carries multicast information based on a link ID, and wherein the IP multicast list descriptor includes a multicast stream ID, a source address, a destination address, and header compression related information.

7. The apparatus of claim 5, wherein the descriptor includes information about transmission of a static chain byte by adaptation of a ROHC channel, wherein, based on the information about the transmission of the static chain byte including a first value, the first value indicates that the static chain byte is extracted from the IP streams and included in the link control information, and wherein, based on the information about the transmission of the static chain byte including a second value, the second value indicates that any additional operation for the IP streams is skipped, and that the static chain byte is not included in the link control information.

8. A method for receiving multicast internet protocol (IP) streams for Multicast Adaptive Bit Rate (MABR) signaling, the method comprising:

receiving the multicast IP streams, the multicast IP streams being identified based on a Multicast Stream identifier (ID);

decompressing Internet Protocol (IP) headers of the multicast IP streams;

parsing link control information for a multicast and a descriptor related to IP header compression; and decapsulating IP header-compressed Robust Header Compression (ROHC) streams, wherein a Context ID (CID) is assigned for each multicast IP stream of the multicast IP streams based on a source IP address, a destination IP address, a source User Datagram Protocol (UDP) port and a destination UDP port, wherein the CID is managed separately for each Generic Stream Encapsulation (GSE) stream of a plurality of GSE streams, wherein the link control information includes a link ID, wherein the Link ID is mapped to a ROHC channel ID, and wherein the descriptor includes identification information for a ROHC channel, a maximum value of a context ID for the ROHC channel, the context ID, and a static chain byte length.

9. An apparatus for receiving multicast internet protocol (IP) streams for Multicast Adaptive Bit Rate (MABR) signaling, comprising:

a memory; and a processor connected to the memory, the processor configured to receive the multicast IP streams, the multicast IP streams being identified based on a Multicast Stream identifier (ID); and a decompressor configured to decompress Internet Protocol (IP) headers of the multicast IP streams, wherein link control information for a multicast and a descriptor related to IP header compression are parsed, wherein IP header-compressed Robust Header Compression (ROHC) streams are decapsulated, wherein a Context ID (CID) is assigned for each multicast IP stream of the multicast IP streams based on a source IP address, a destination IP address, a source User Datagram Protocol (UDP) port and a destination UDP port, wherein the CID is managed separately for each Generic Stream Encapsulation (GSE) stream of a plurality of GSE streams, wherein the link control information includes a link ID, wherein the Link ID is mapped to a ROHC channel ID, and wherein the descriptor includes identification information for a ROHC channel, a maximum value of a context ID for the ROHC channel, the context ID, and a static chain byte length.

* * * * *